Aug. 21, 1962   E. J. McGRATH ETAL   3,050,199
APPARATUS FOR HANDLING CASES
Filed May 14, 1956   28 Sheets-Sheet 12
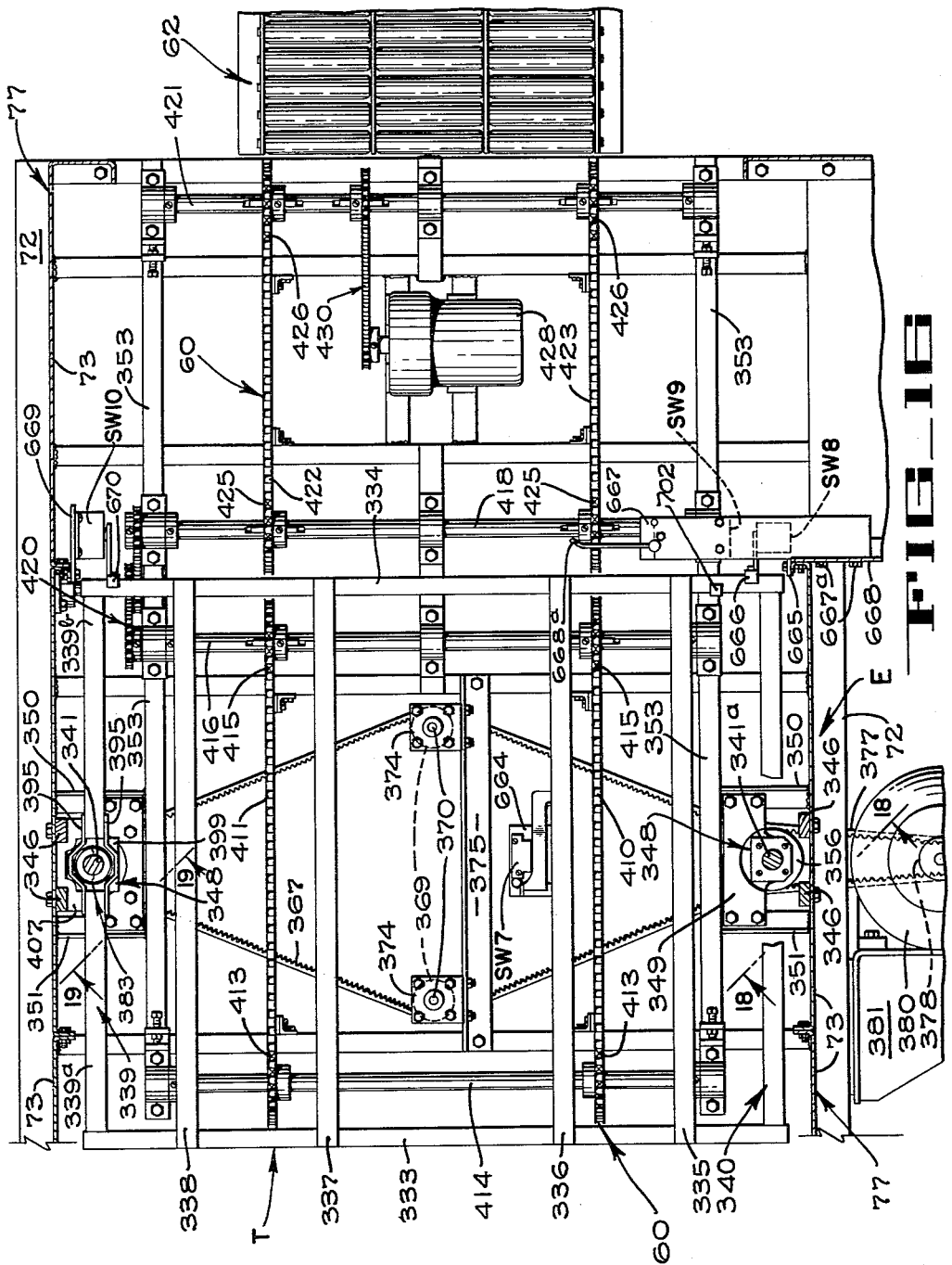
INVENTORS
EARLE J. McGRATH
CLARENCE H. STEVENSON III
BY Hans G. Hoffmeister
ATTORNEY

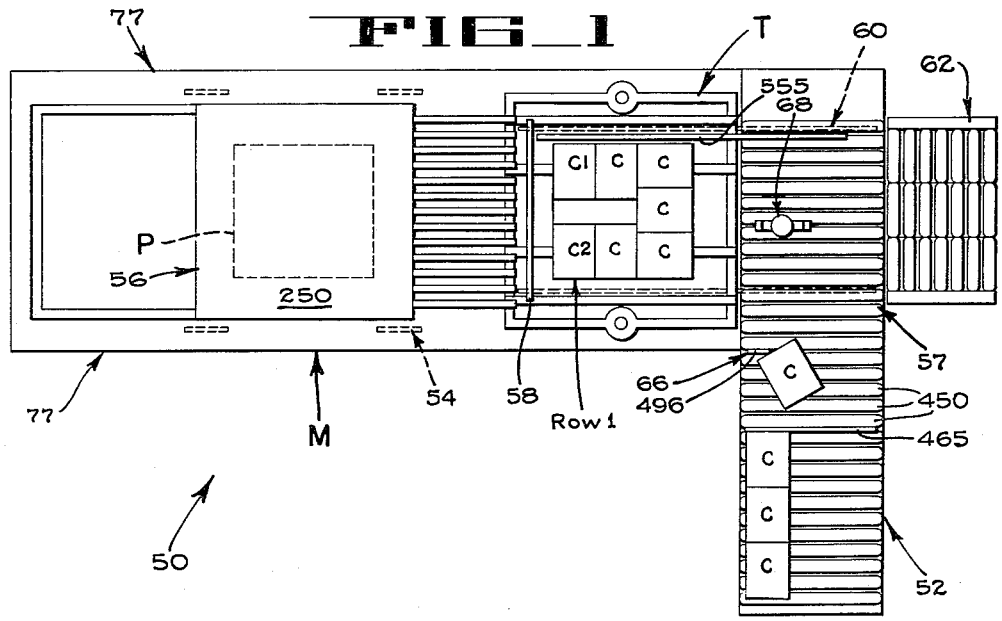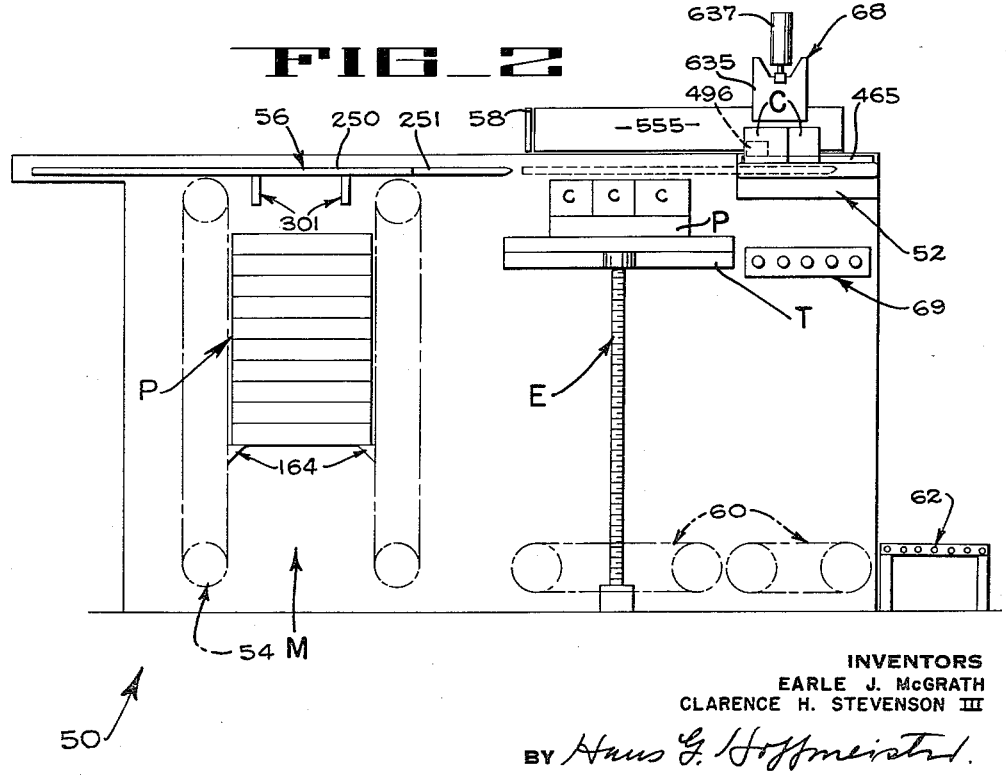

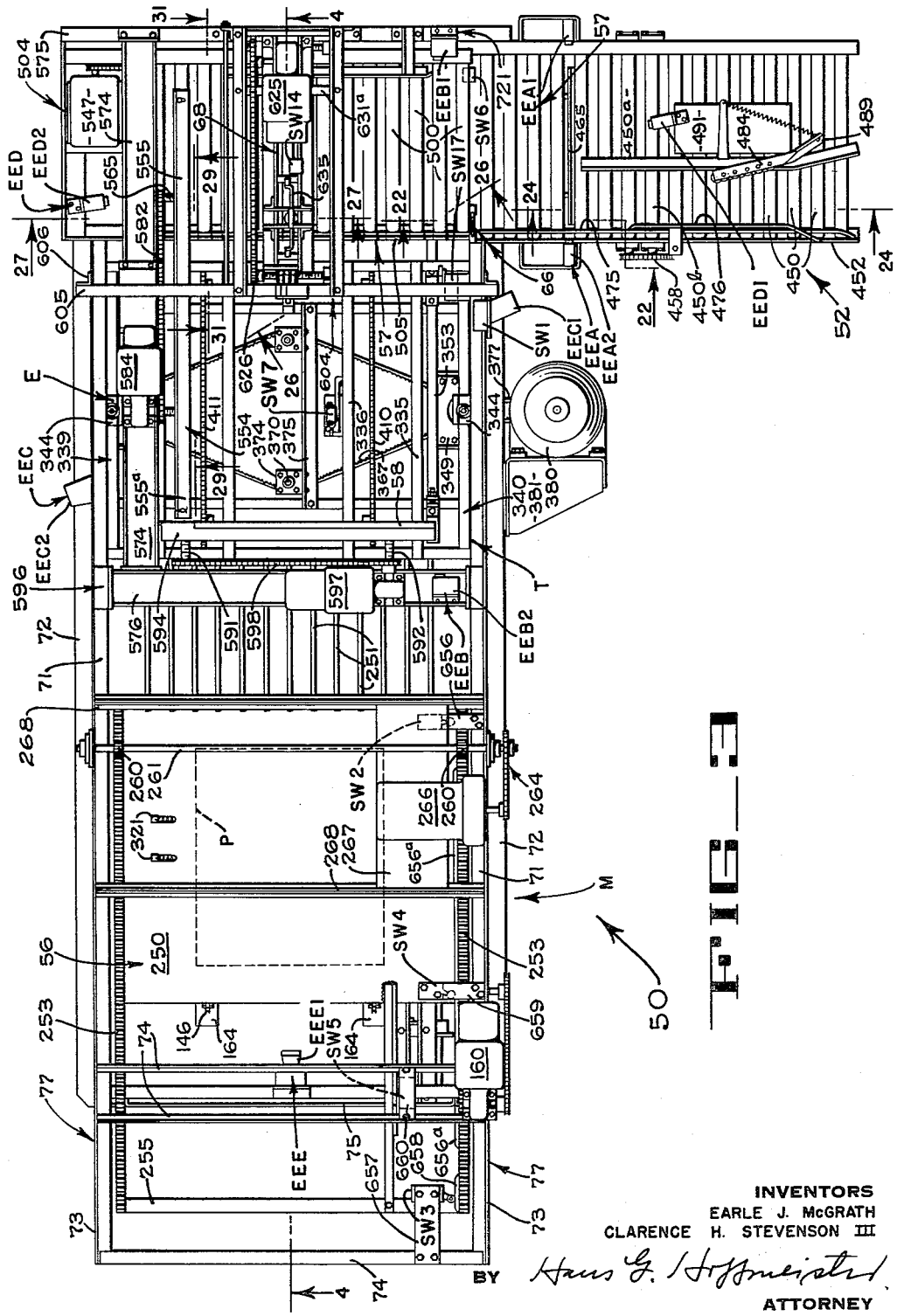

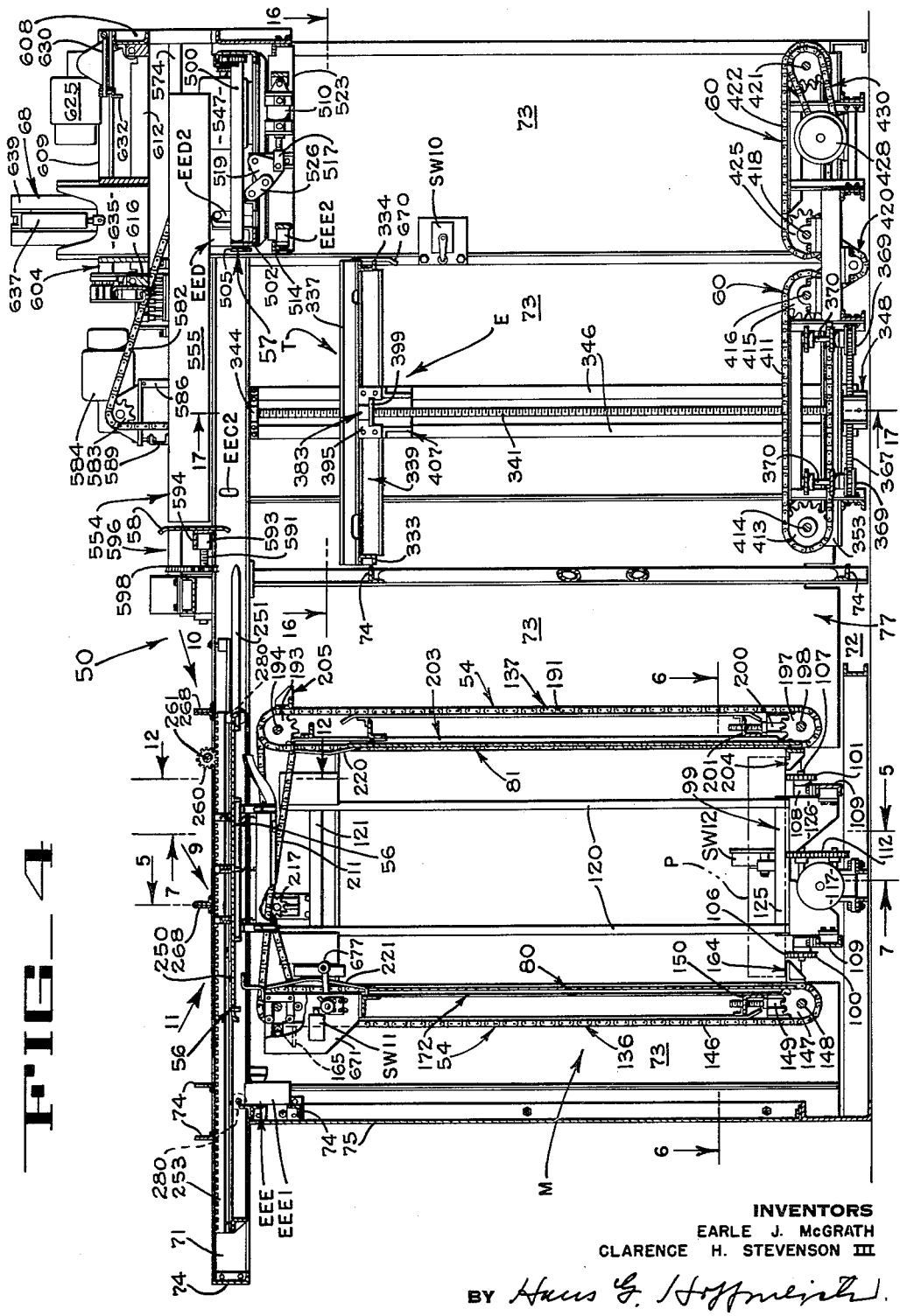

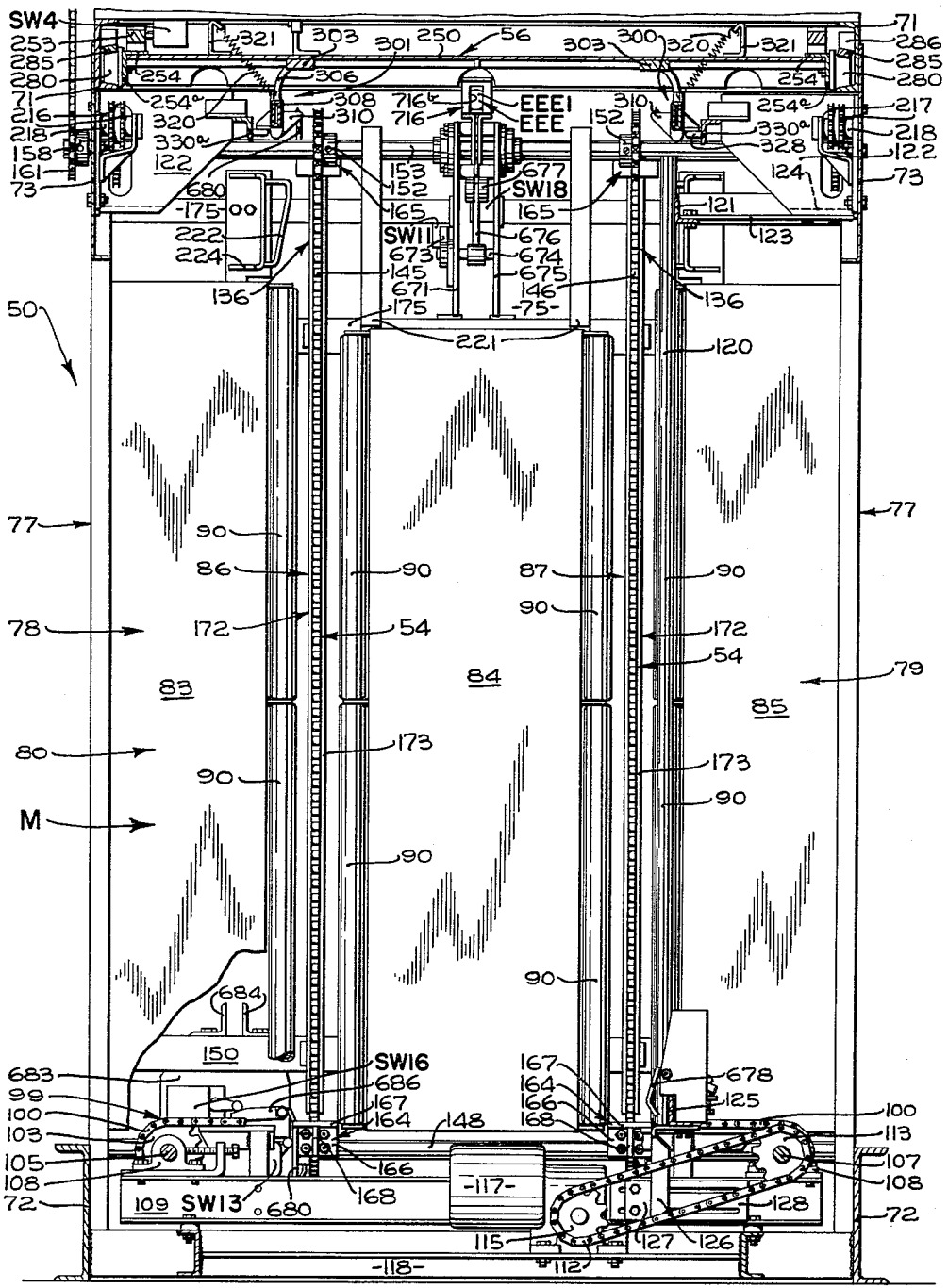

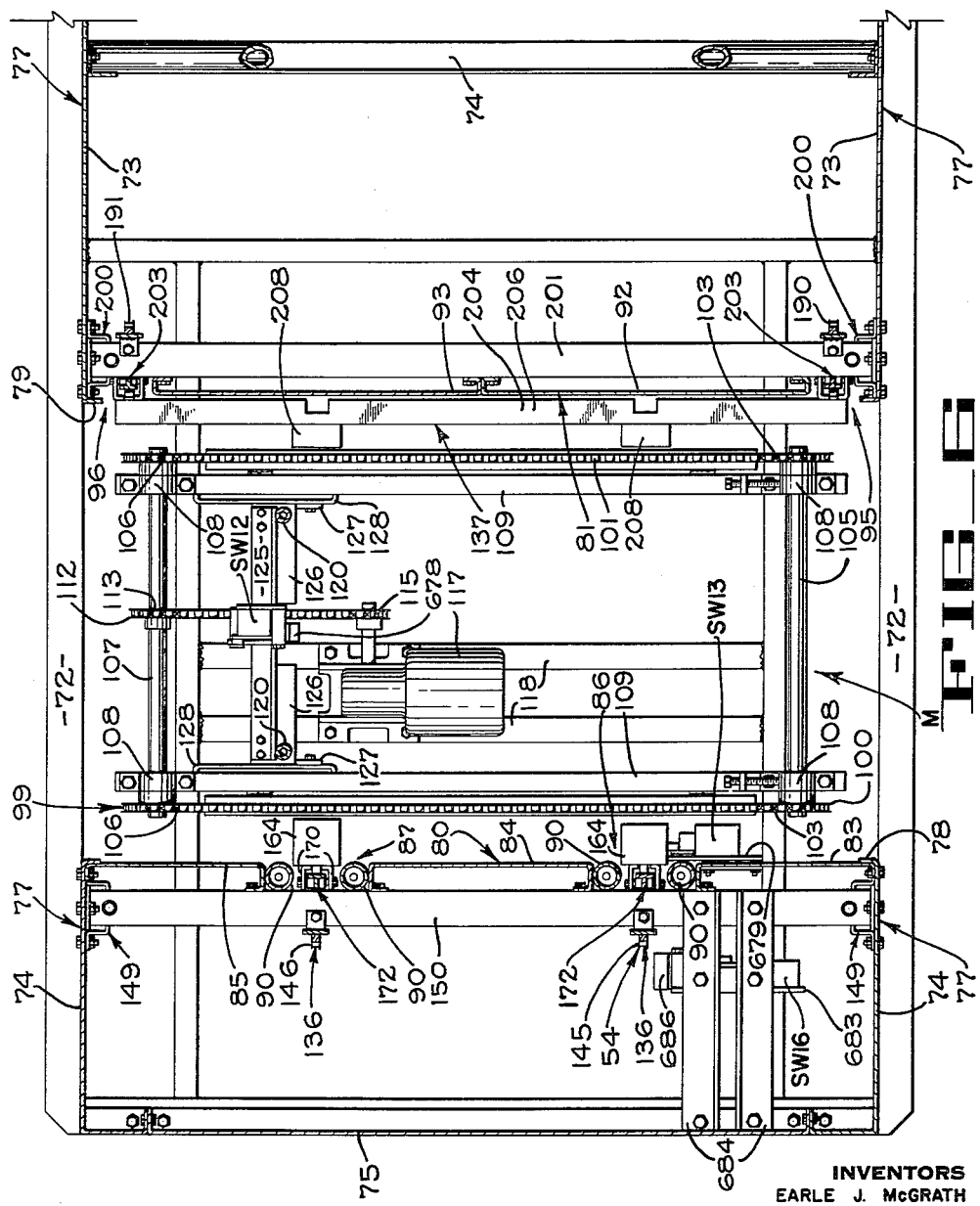

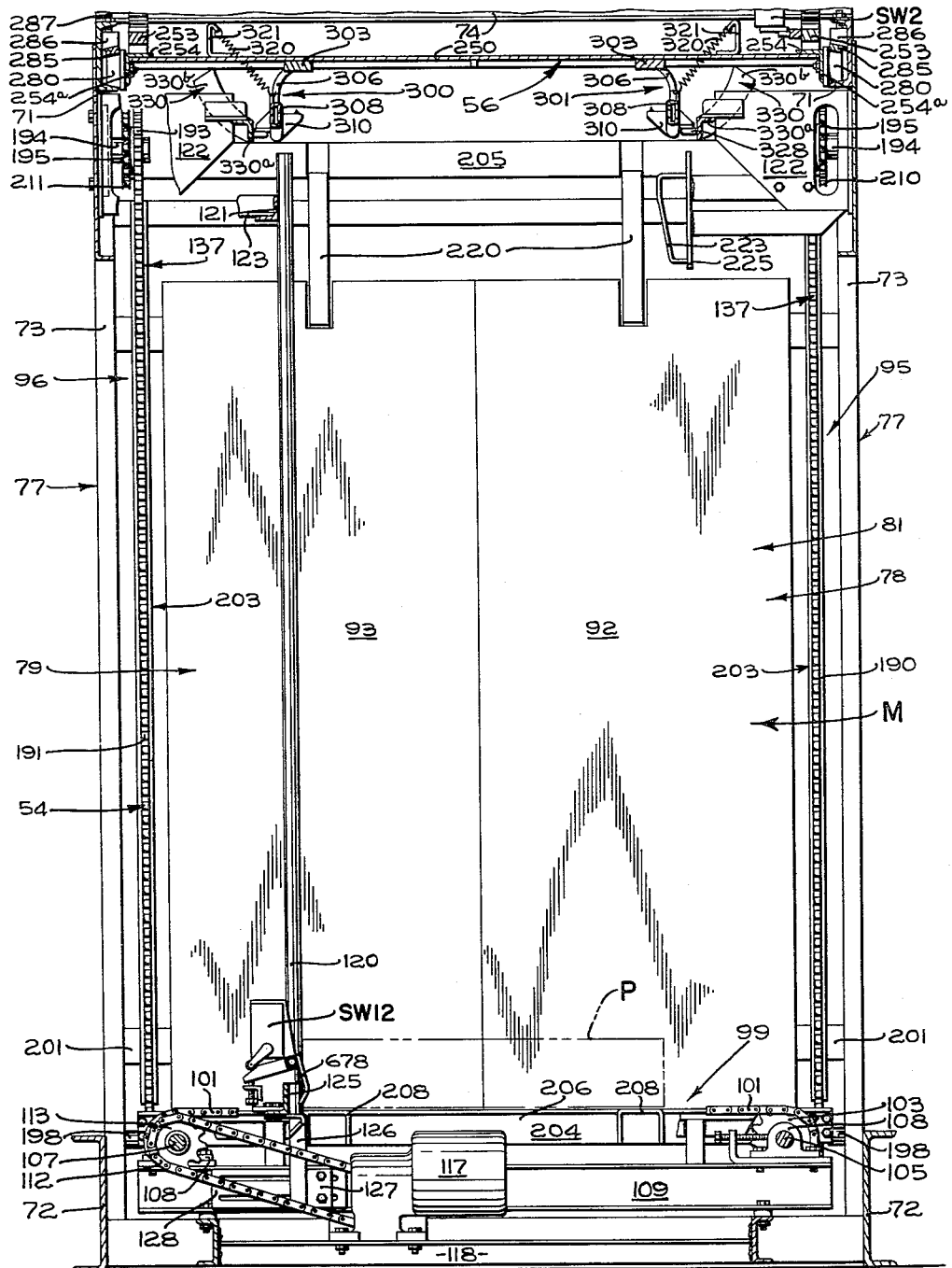

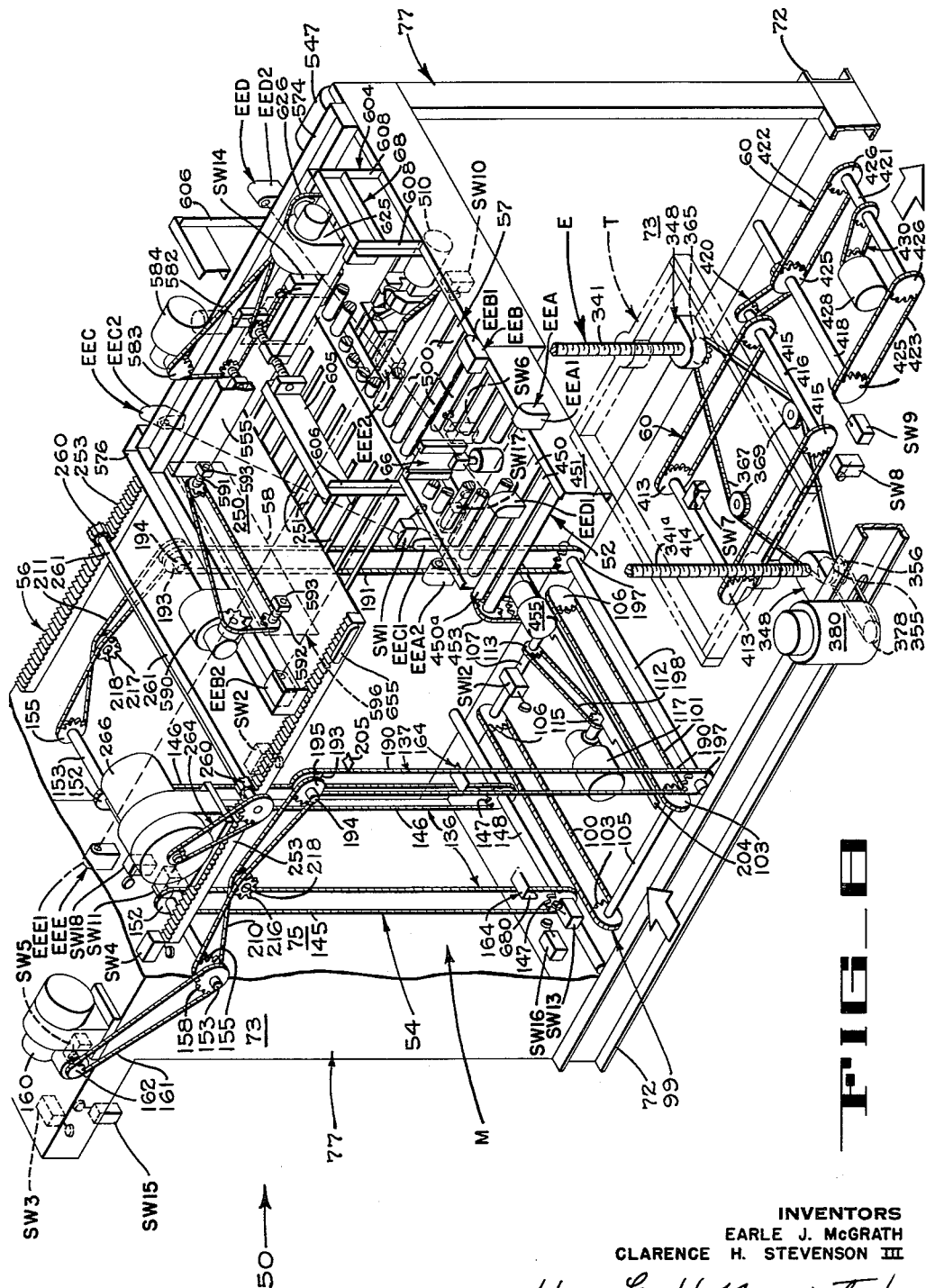

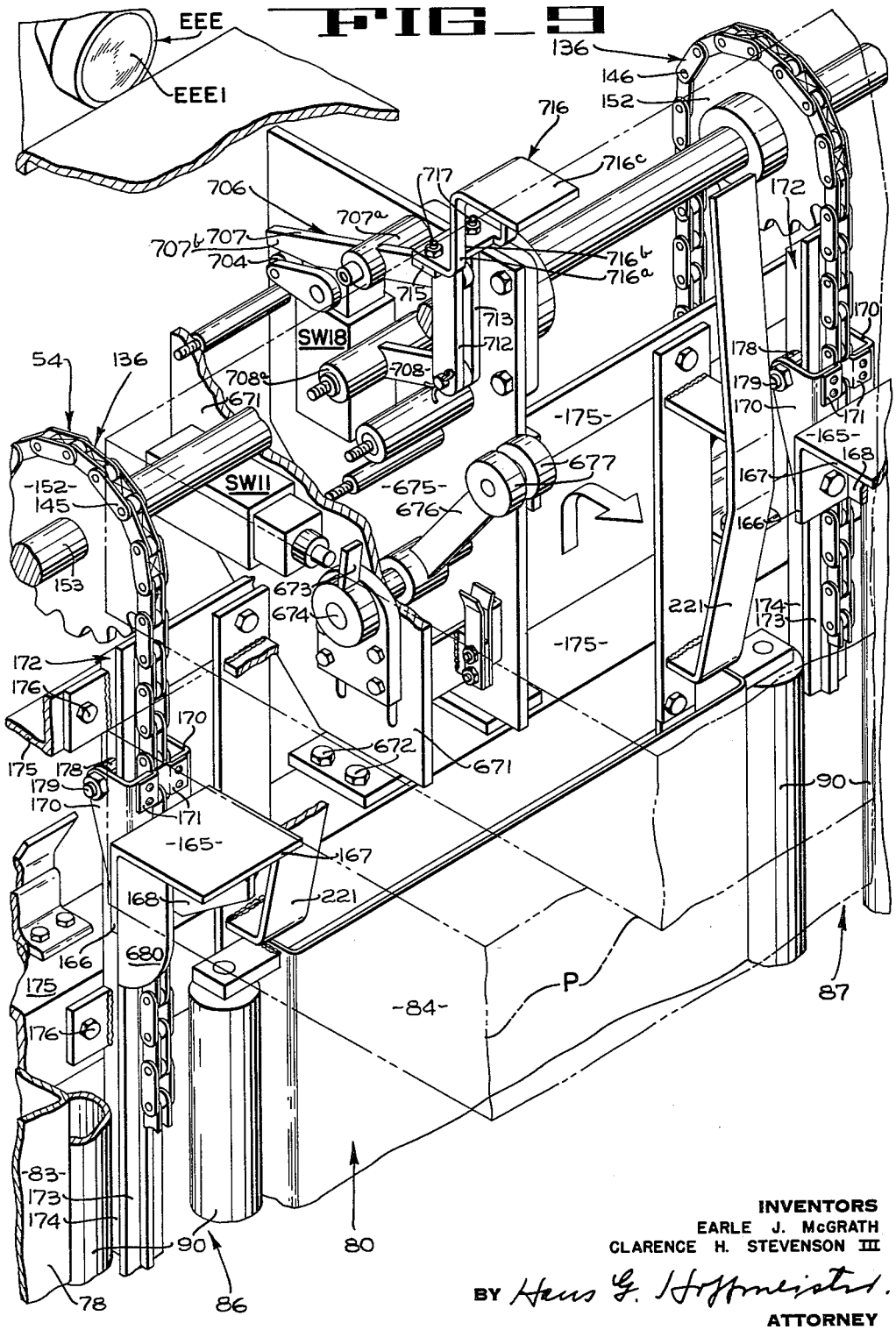

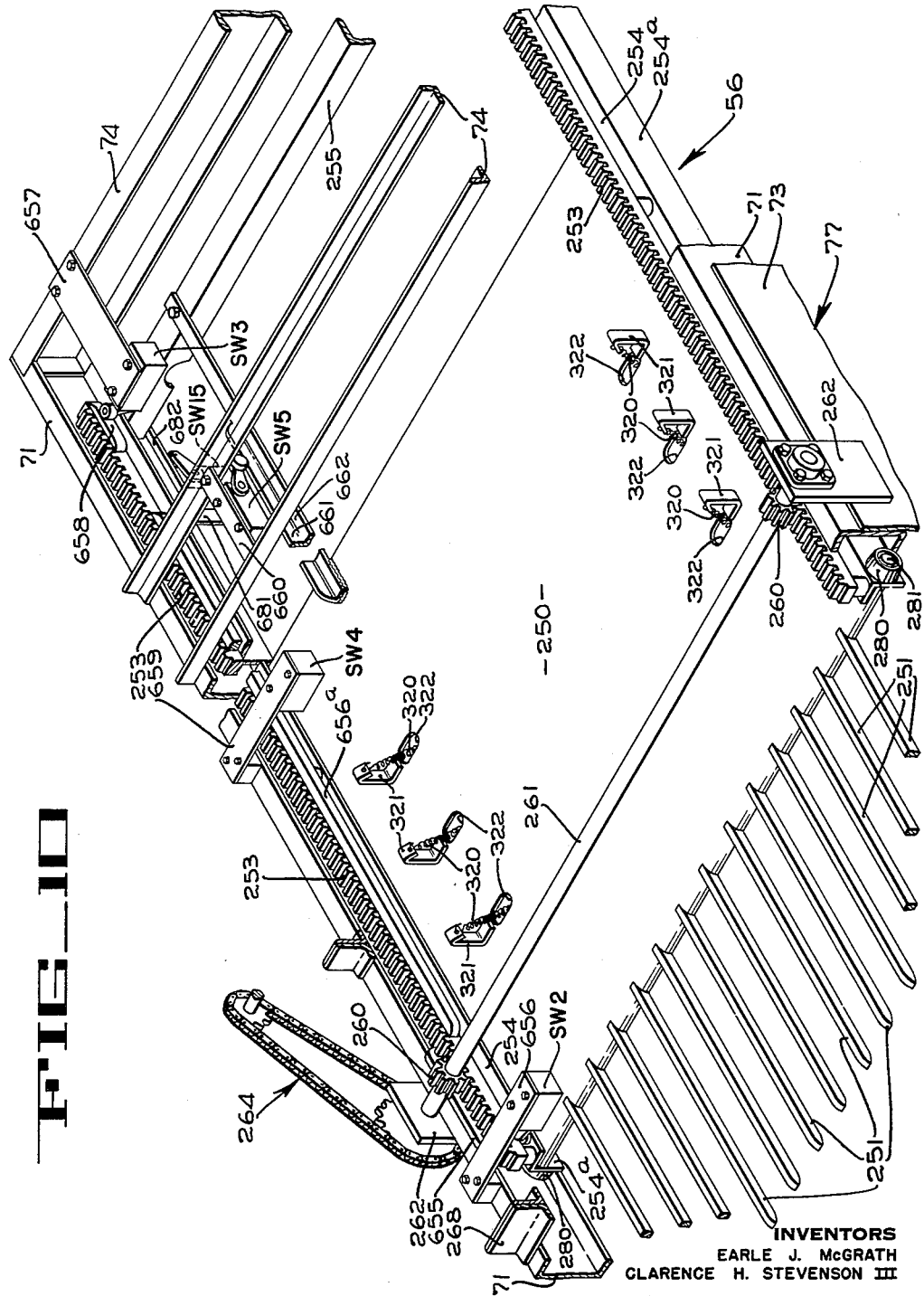

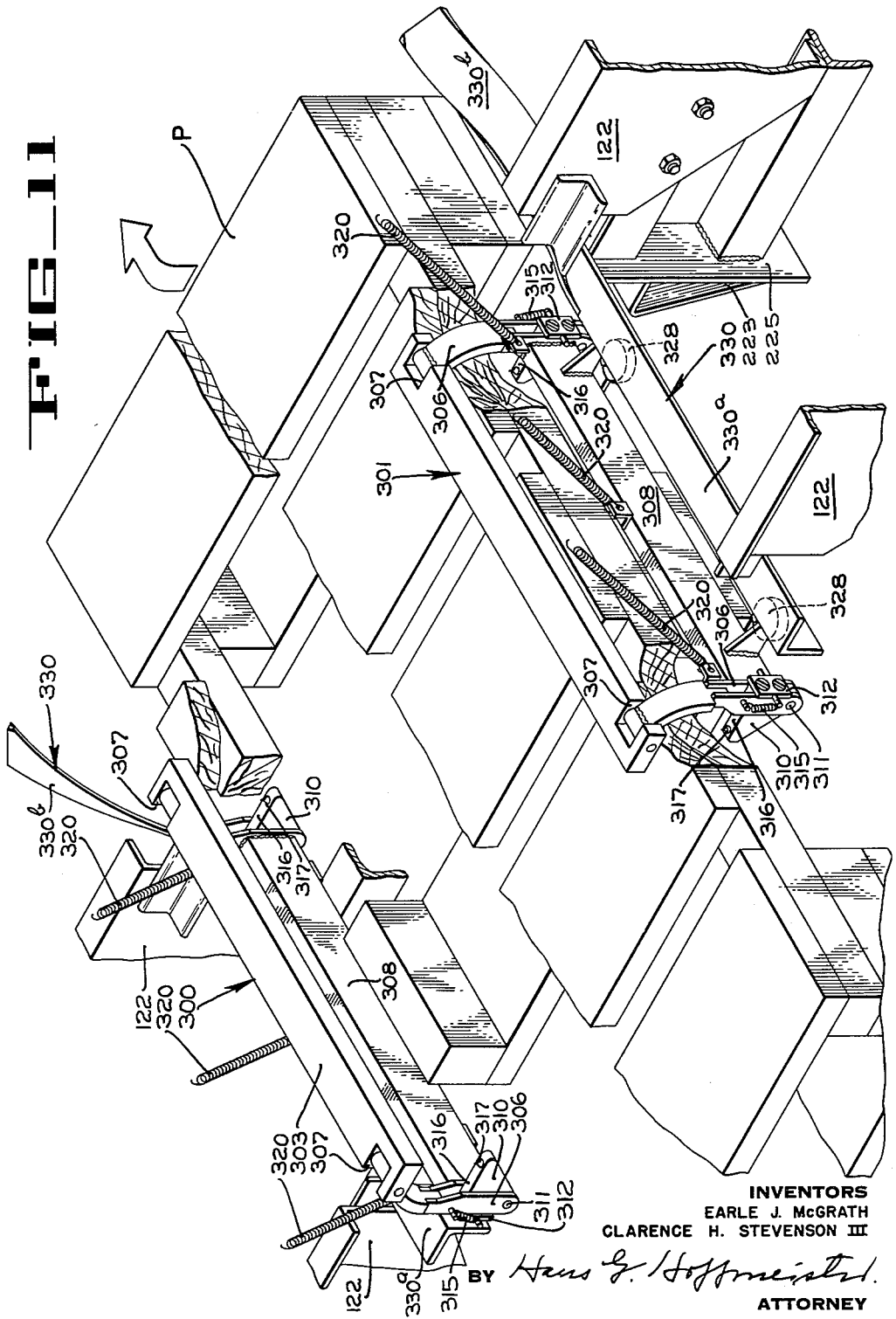

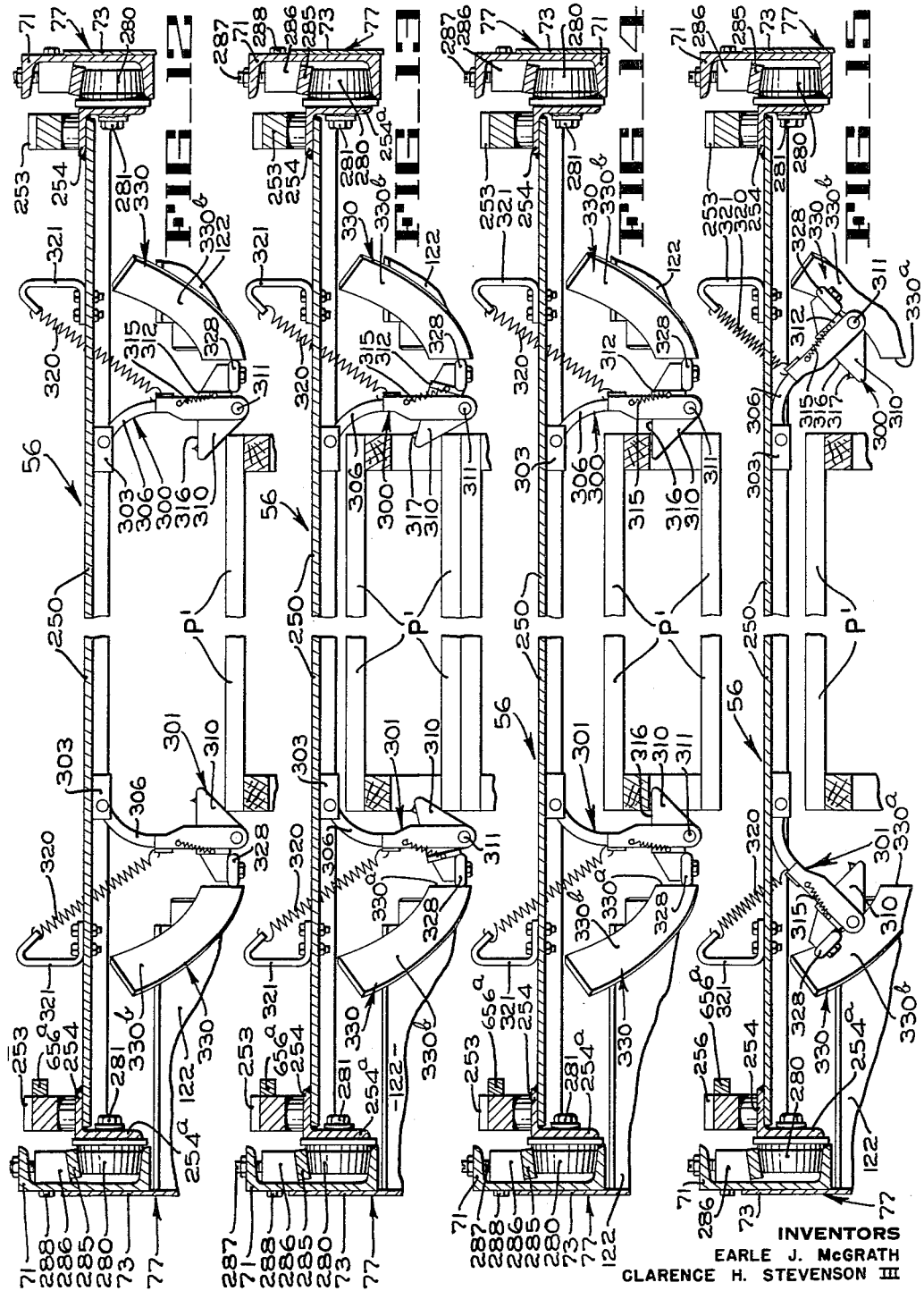

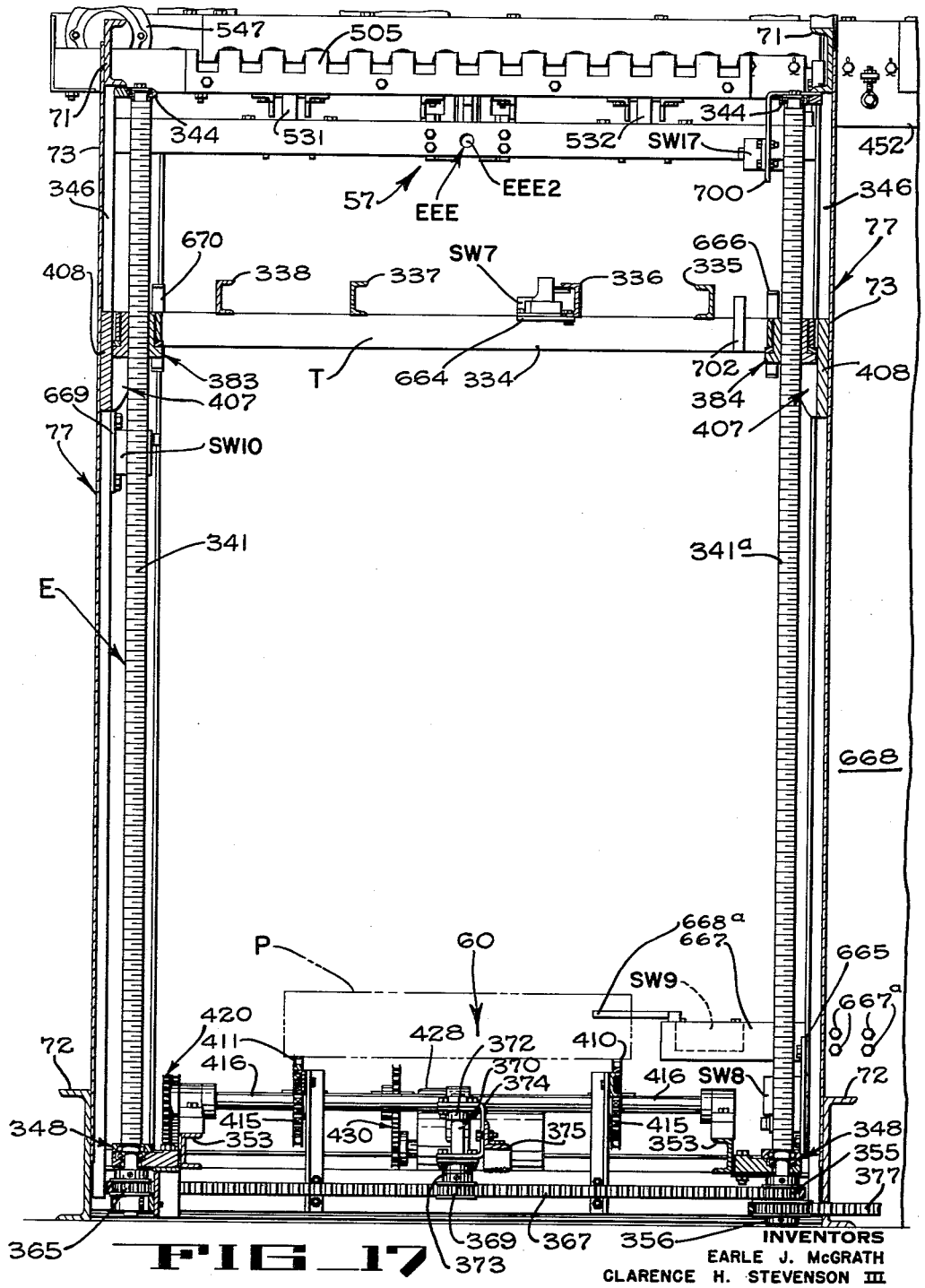

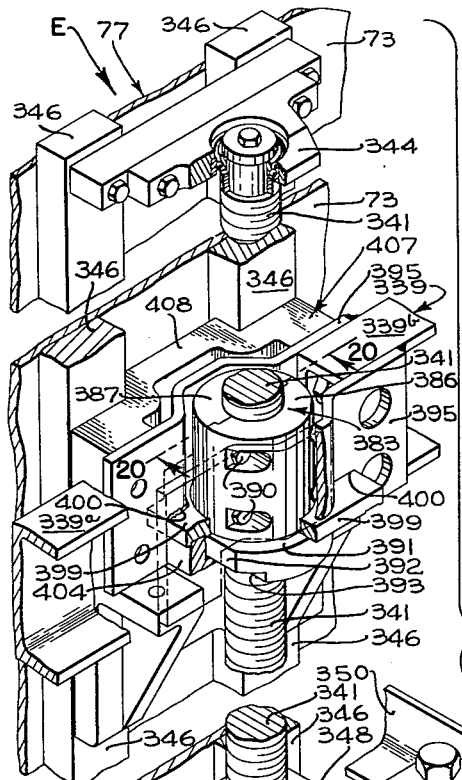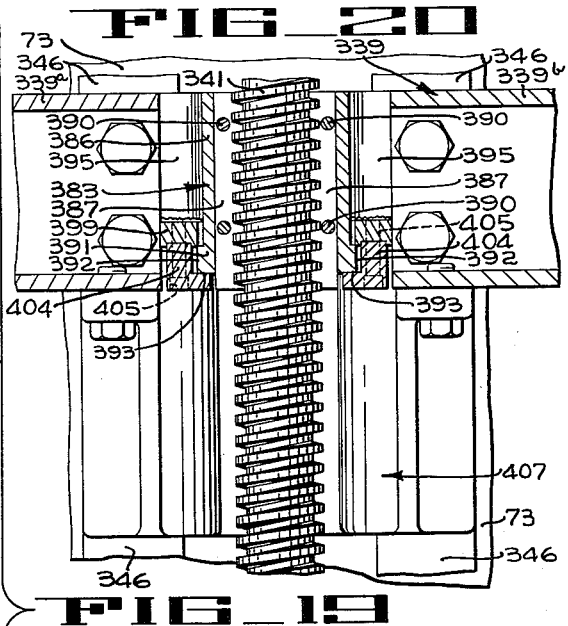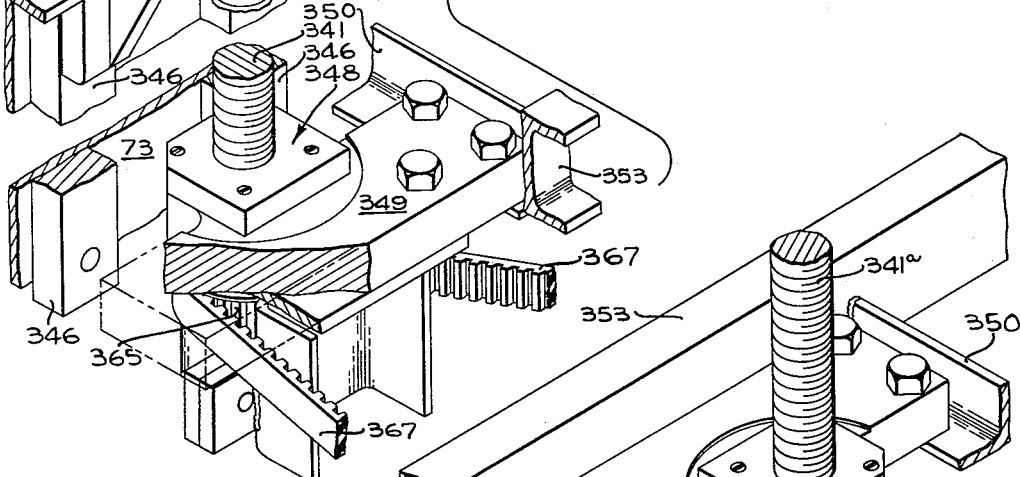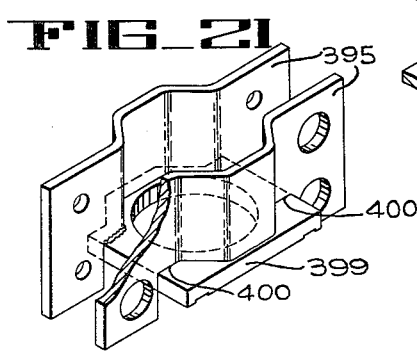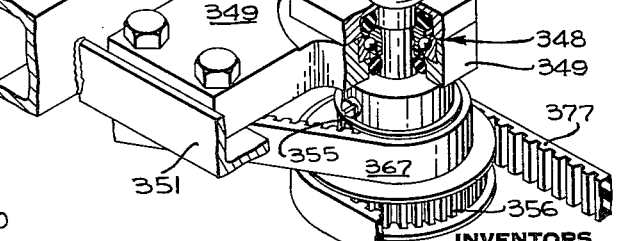

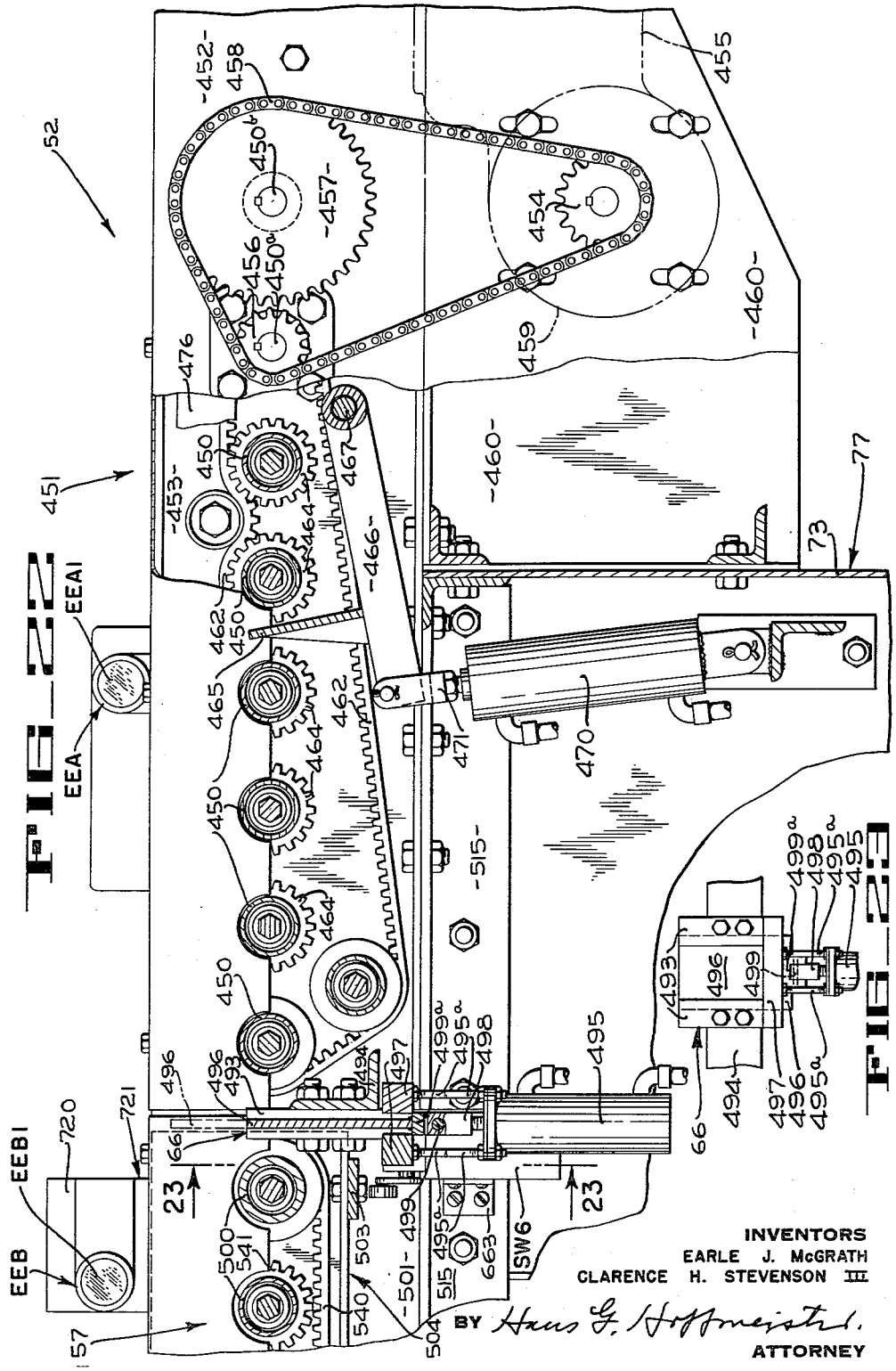

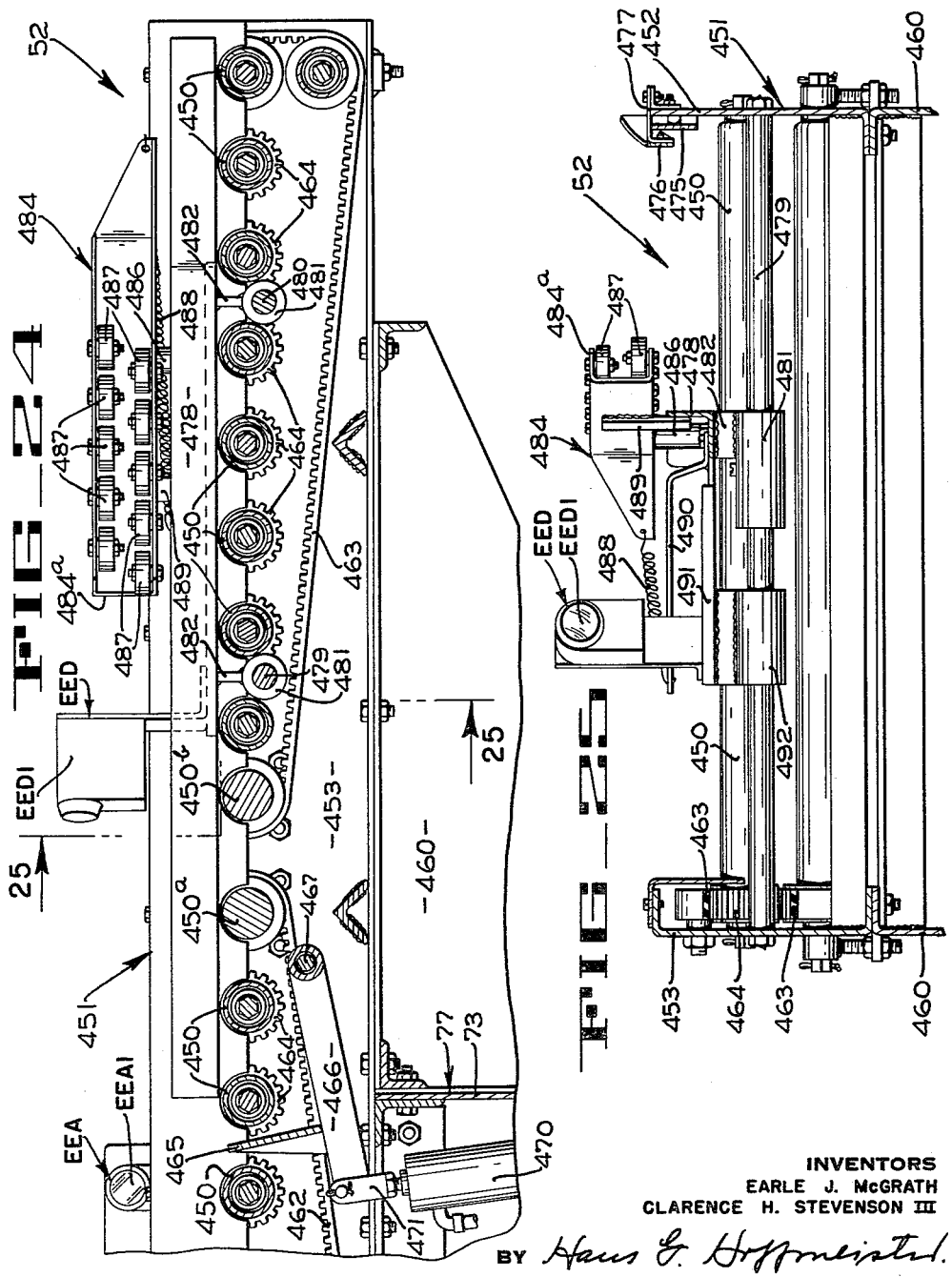

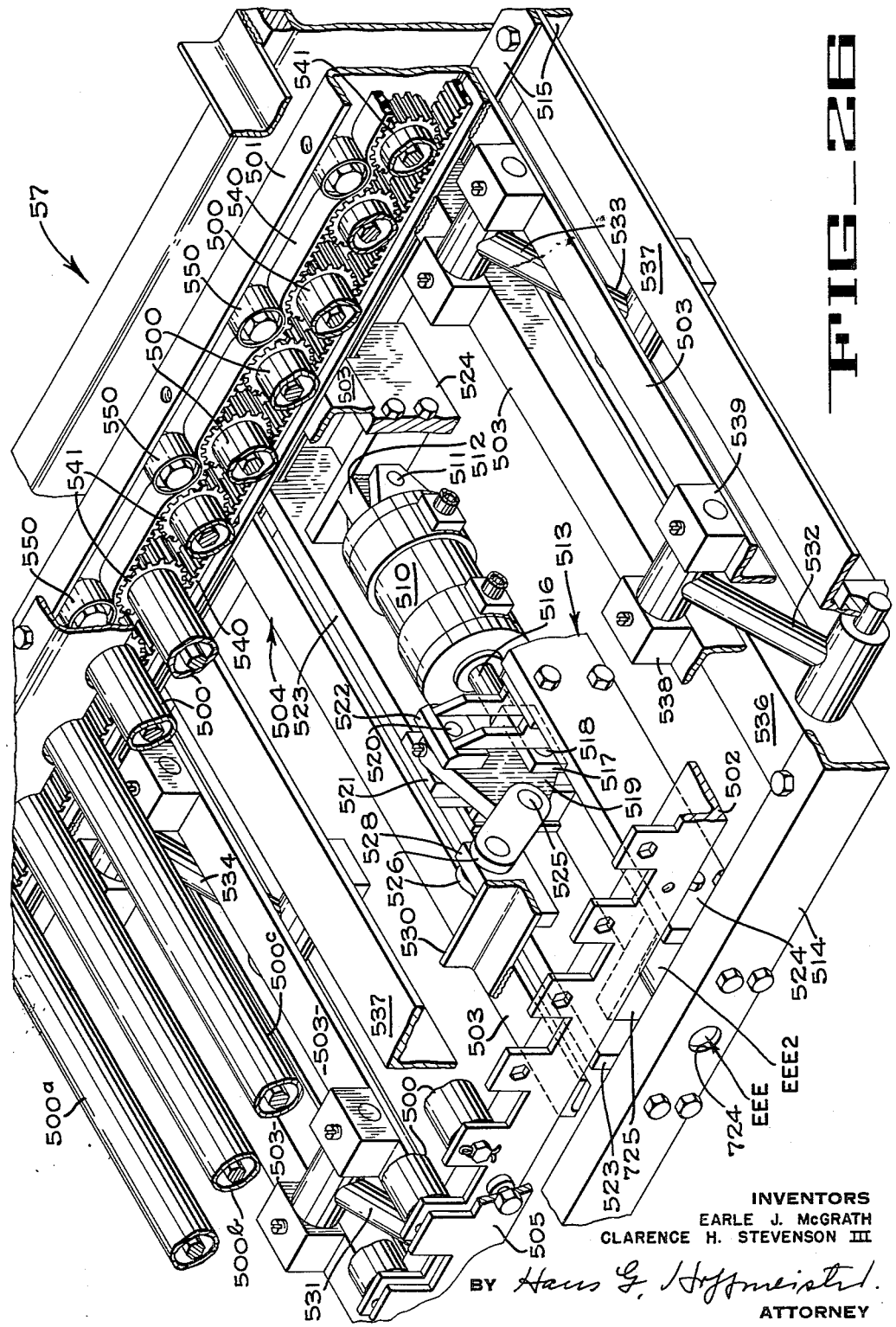

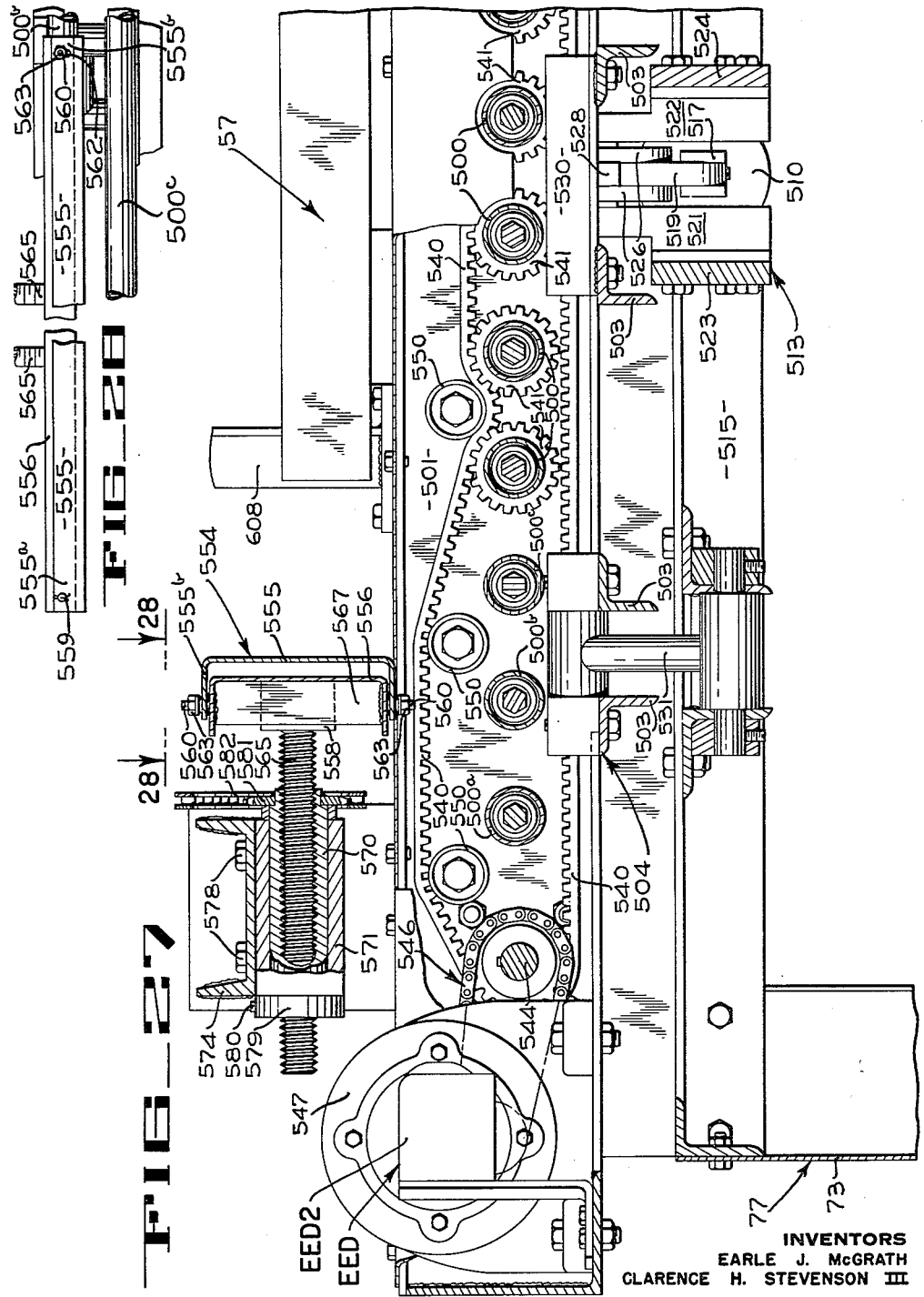

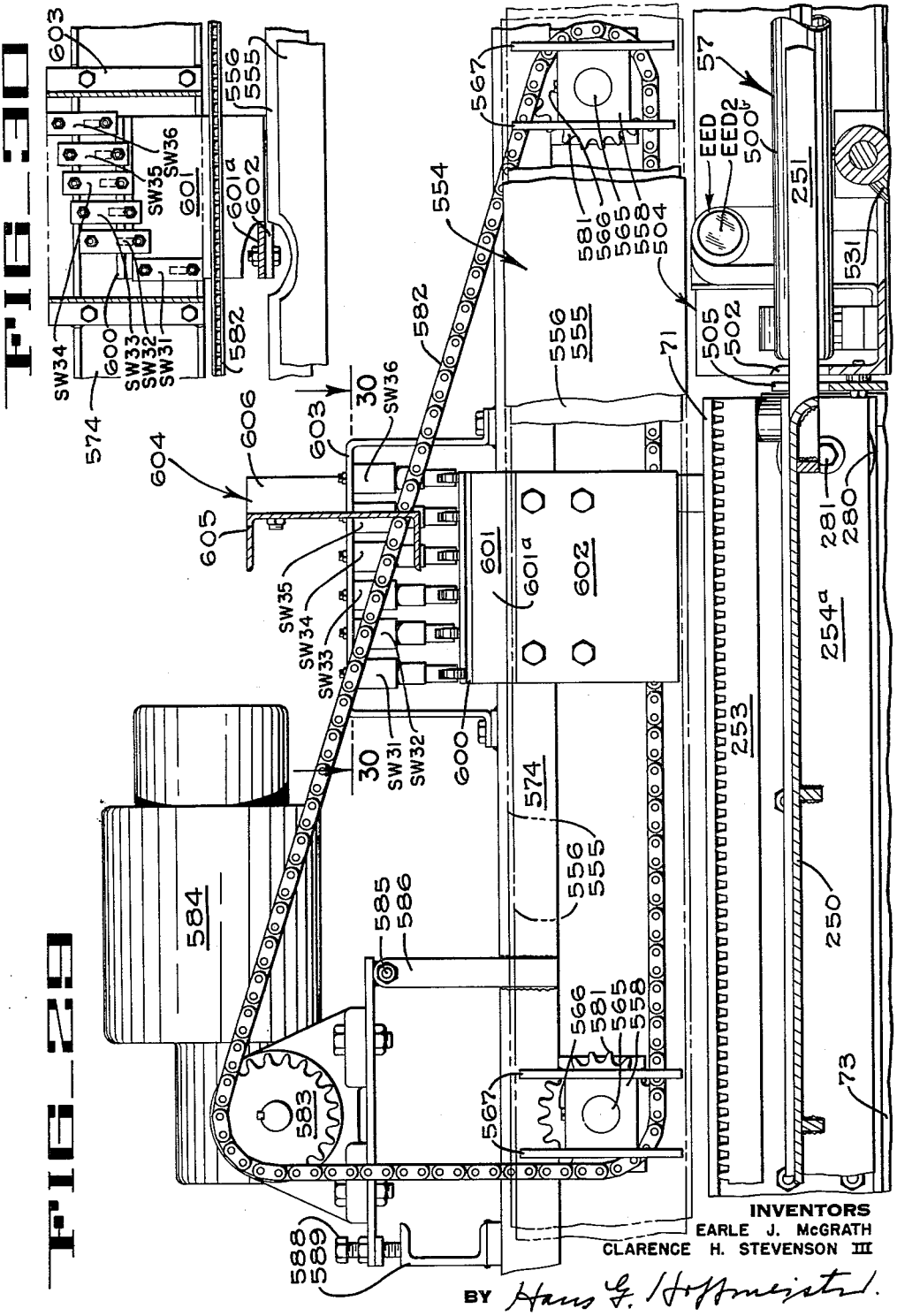

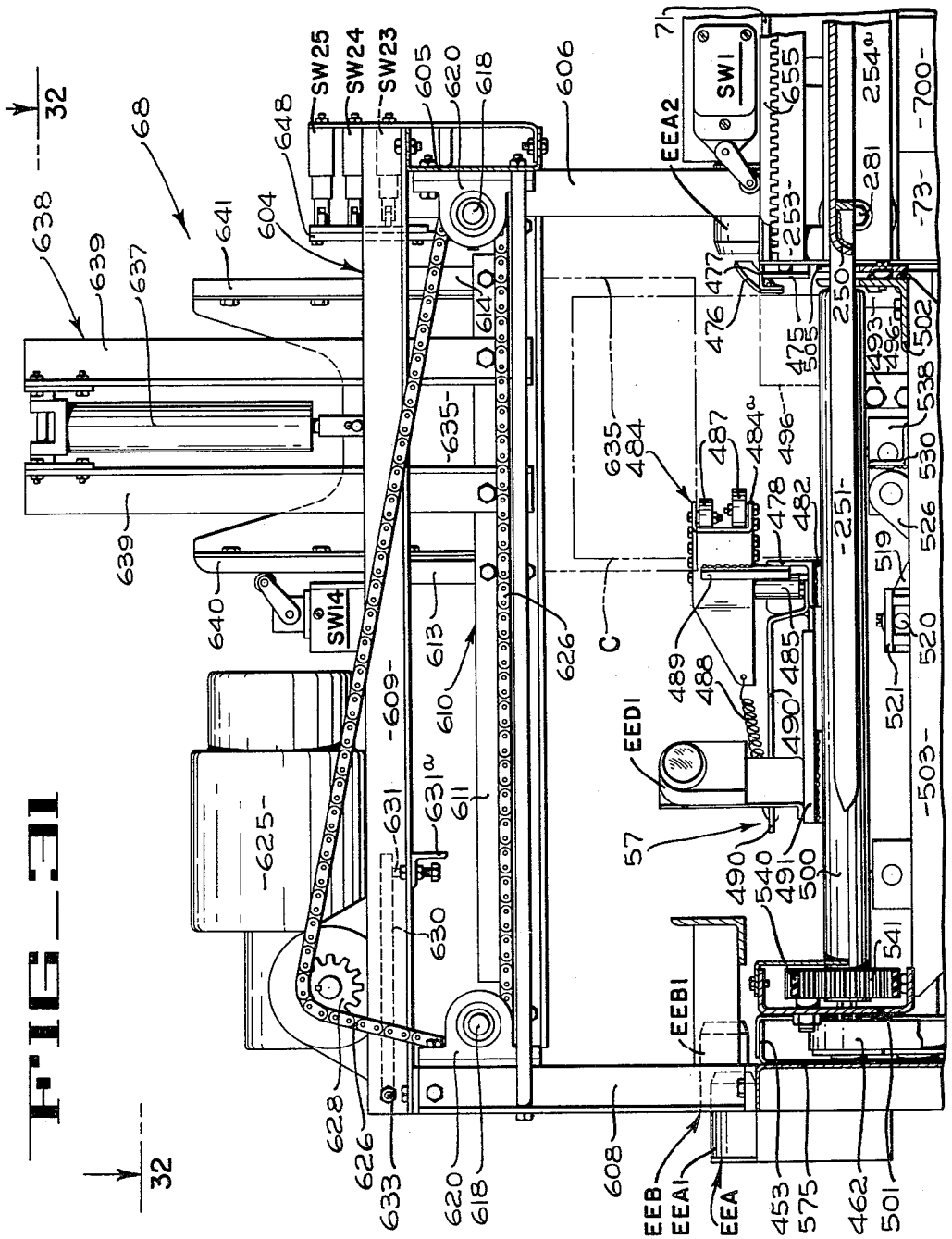

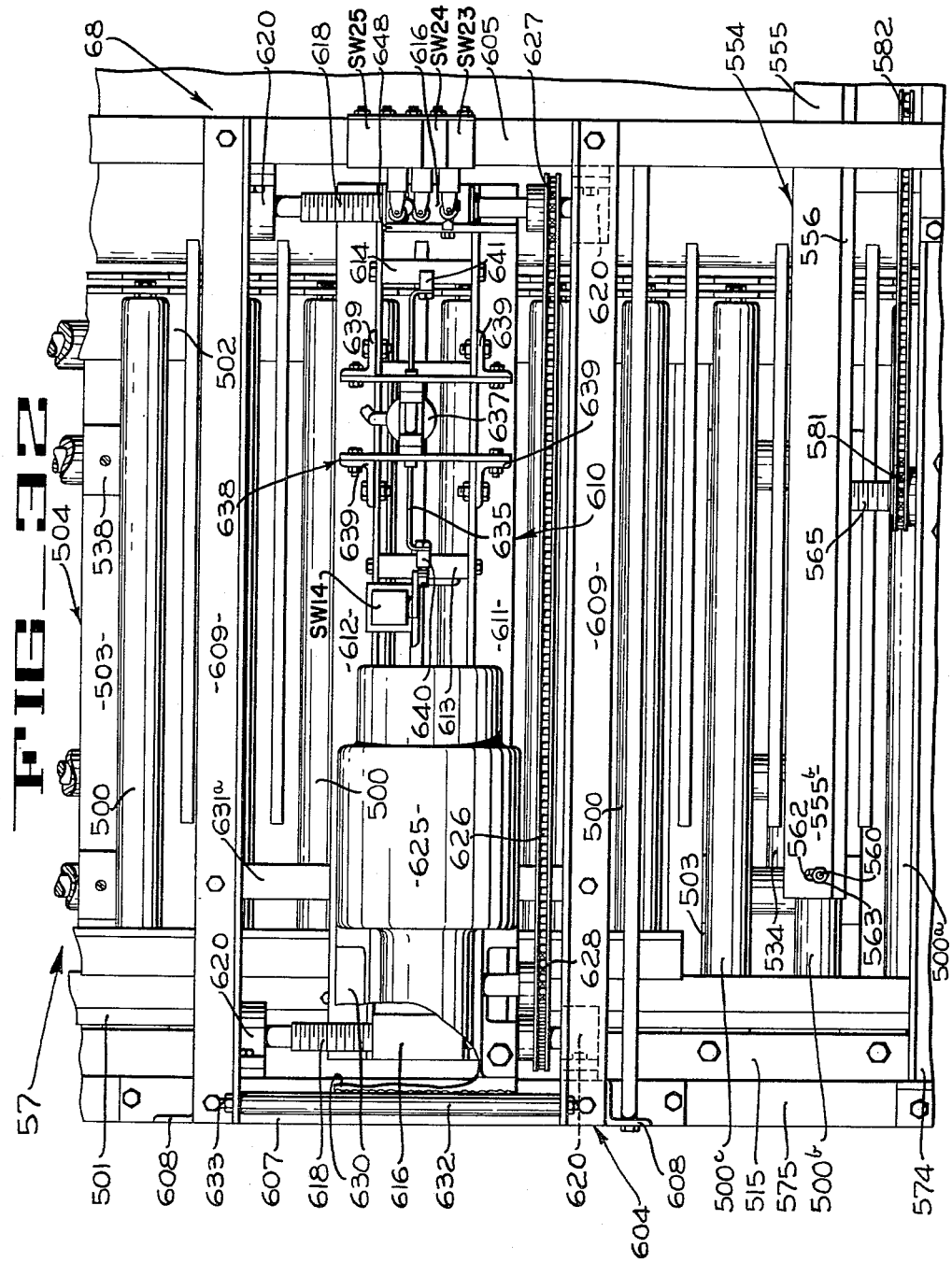

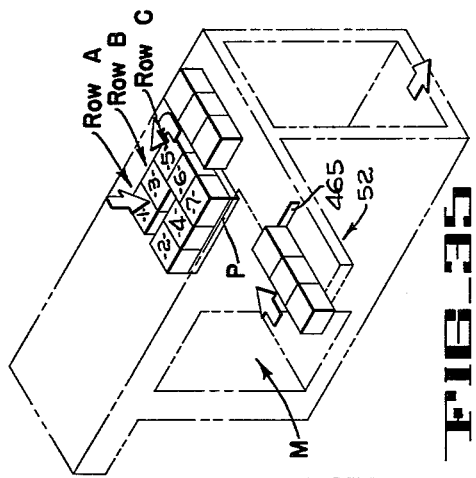
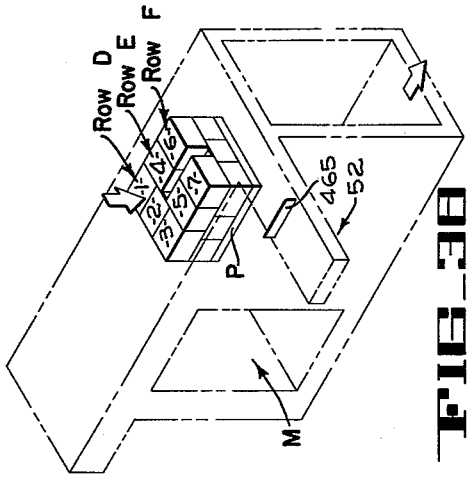
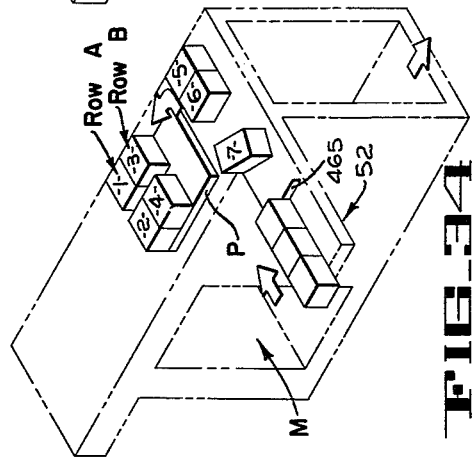
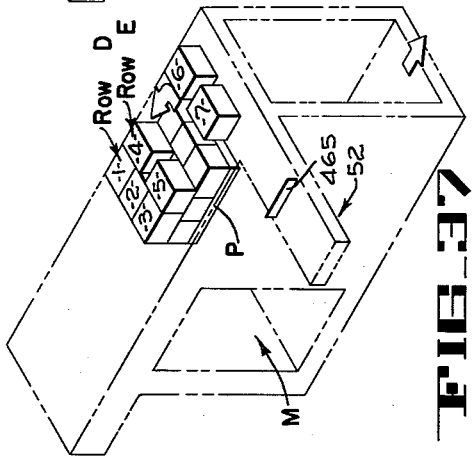
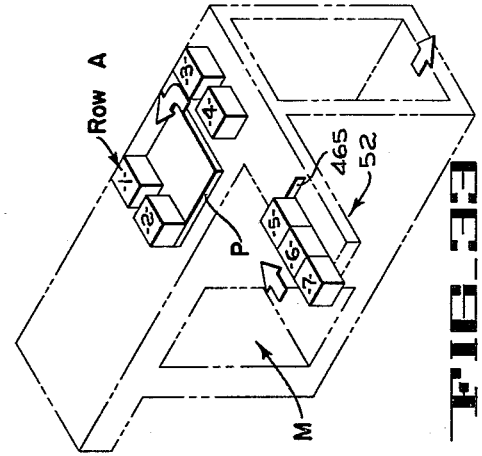
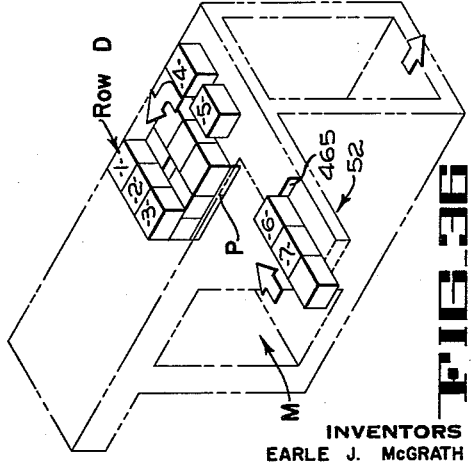
INVENTORS
EARLE J. McGRATH
CLARENCE H. STEVENSON III
ATTORNEY

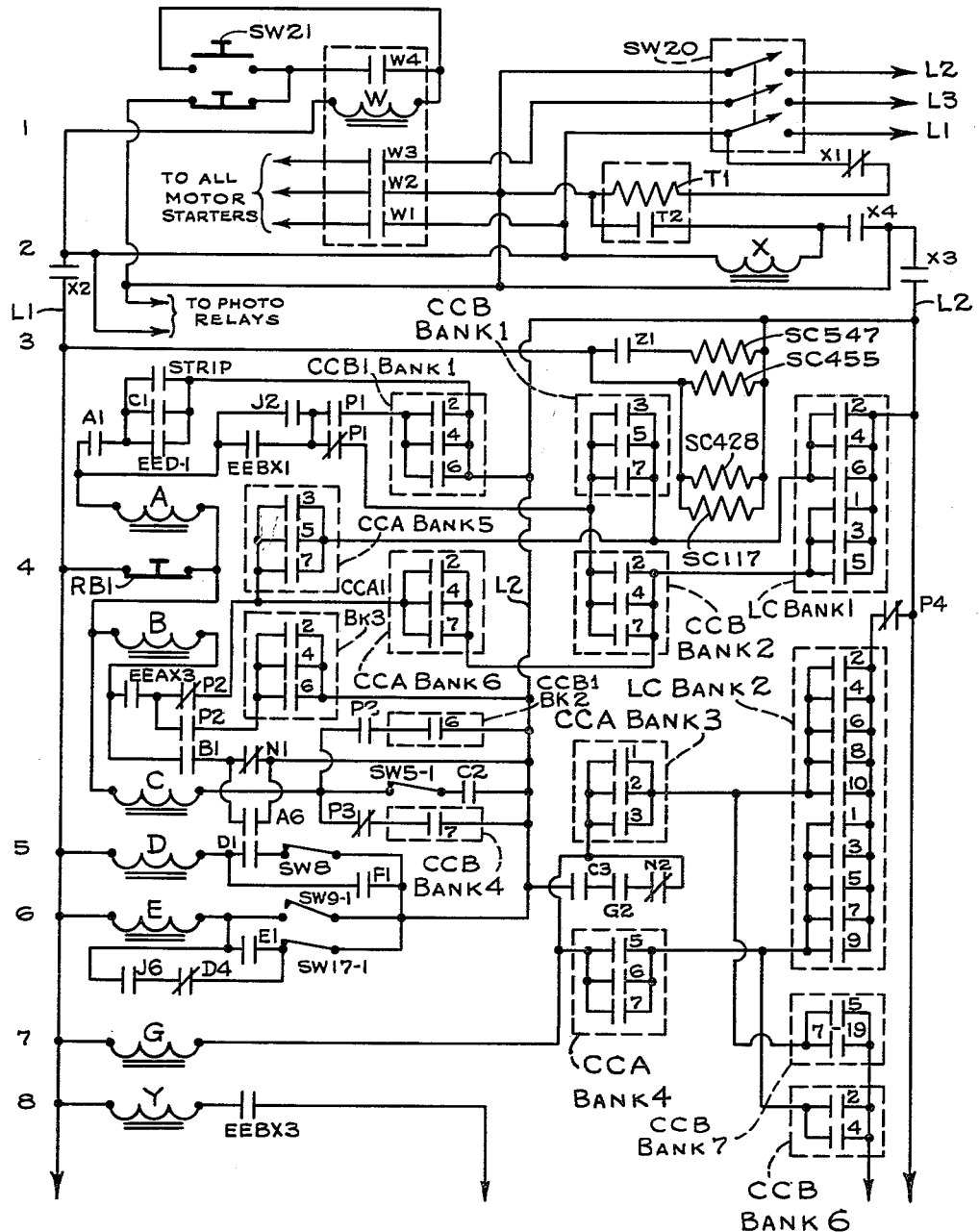
FIG_39

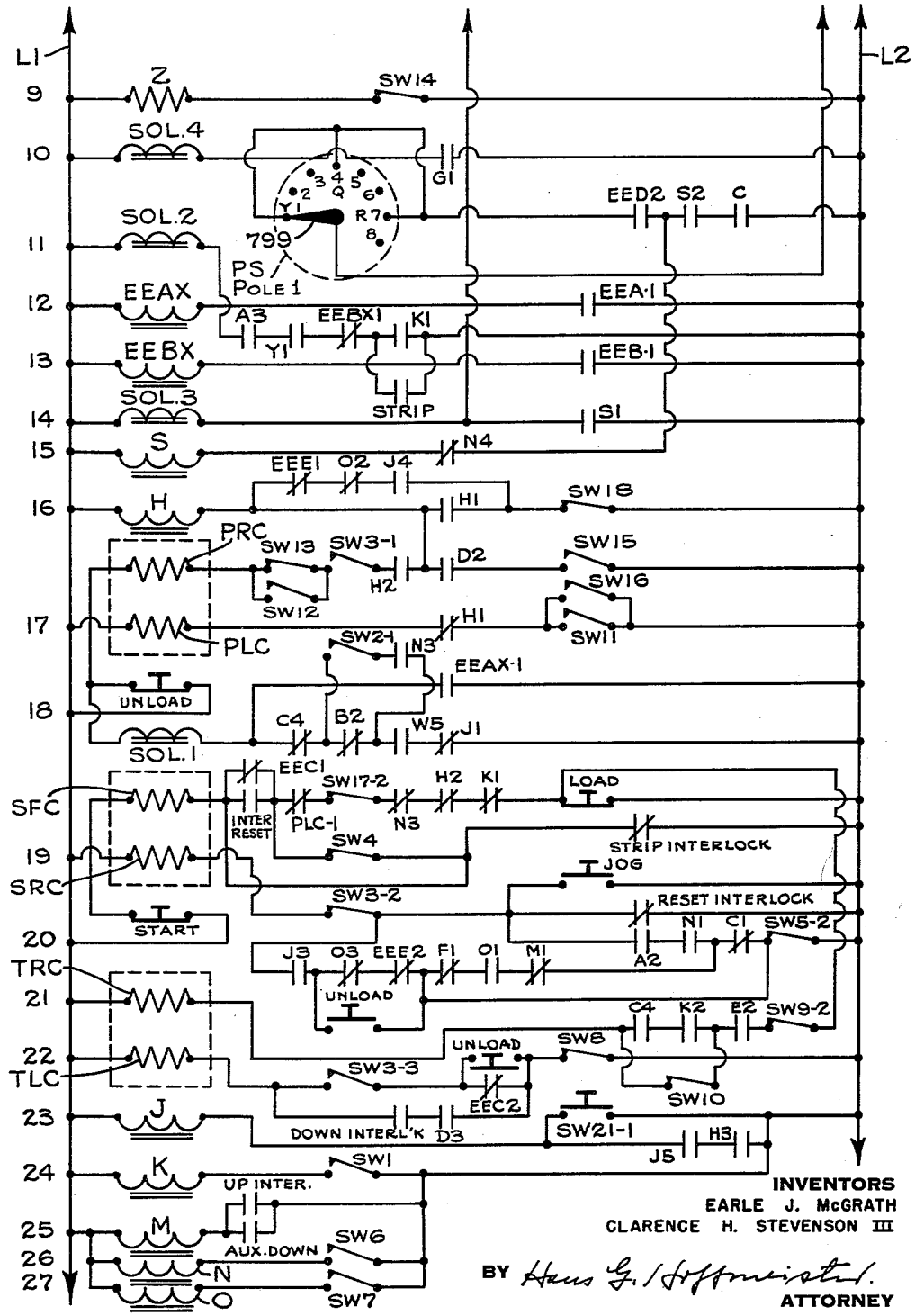

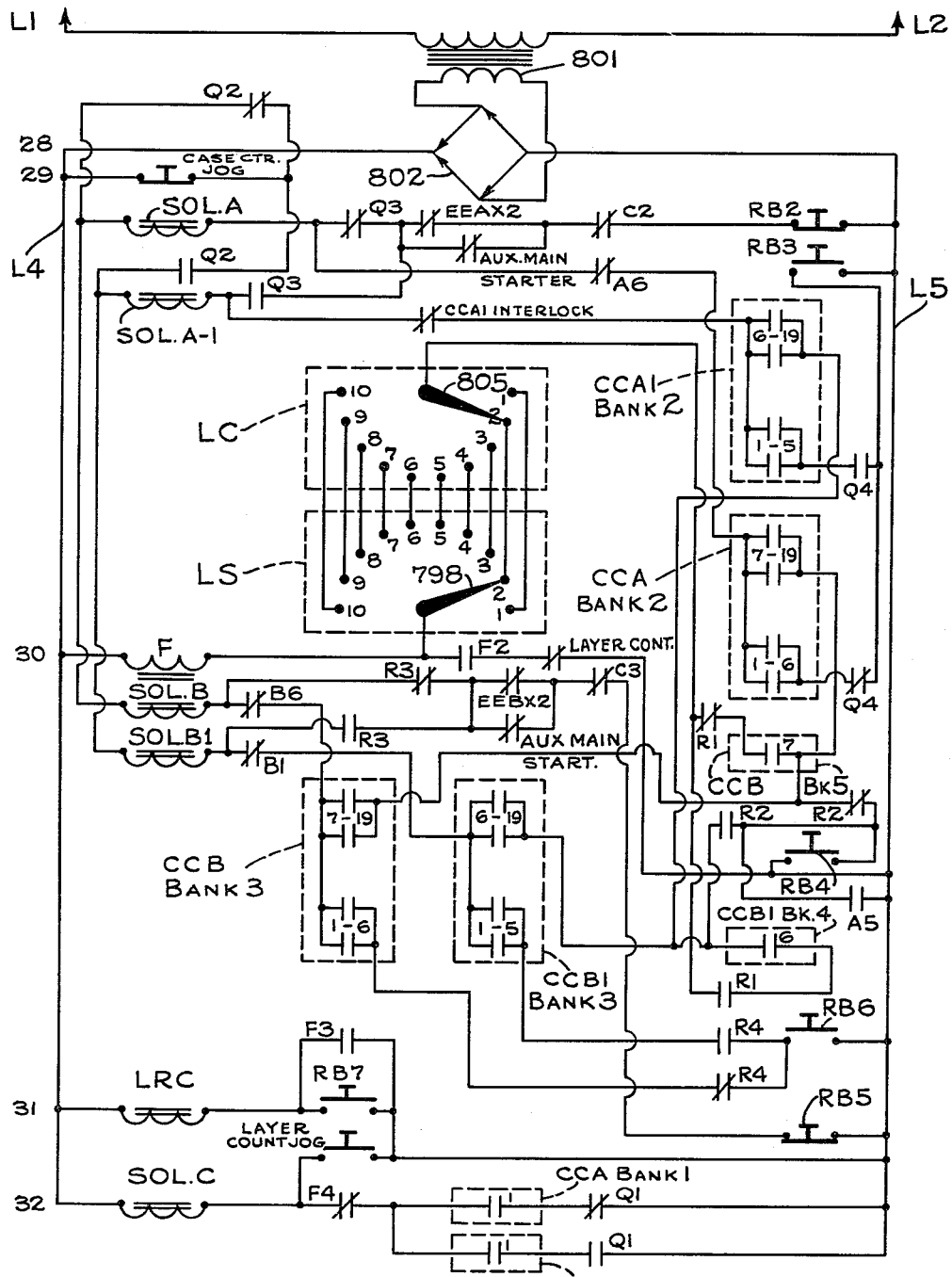
FIG_41

Aug. 21, 1962 E. J. McGRATH ETAL 3,050,199
APPARATUS FOR HANDLING CASES
Filed May 14, 1956 28 Sheets-Sheet 26

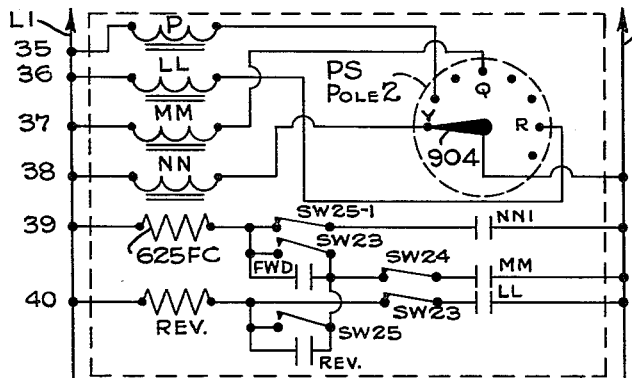

FIG. 43

| LIMIT SWITCH | 23 | 24 | 25 |
|---|---|---|---|
| RELAY | LL | MM | NN |
| CASES | R | Q | Y |
| PS SWITCH POSITION | 7 | 4 | 1 |

← CASE FLOW

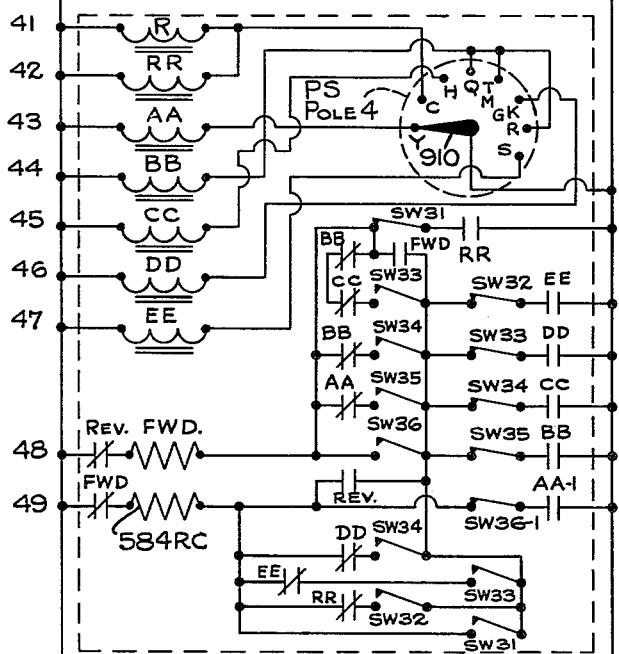

FIG. 44

| LIMIT SWITCH | 36 | 35 | 34 | 33 | 32 | 31 |
|---|---|---|---|---|---|---|
| RELAY | AA | BB | CC | DD | EE | RR |
| CASES | Y | T,R M,Q | H | K,G | S | C |
| PS SWITCH POSITION | 1 | 4,5 7 | 3 | 6 | 8 | 2 |

← CASE FLOW

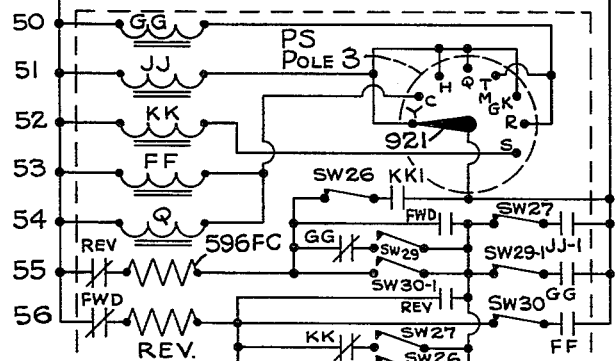

FIG. 45

| LIMIT SWITCH | 30 | 29 | 27 | 26 |
|---|---|---|---|---|
| RELAY | FF | GG | JJ | KK |
| CASES | C | T R M | H,Y, Q,K, G | S |
| PS SWITCH POSITION | 2 | 5 7 | 1,3 4,6 | 8 |

← MACHINE REAR

FIG. 42

INVENTORS
EARLE J. McGRATH
CLARENCE H. STEVENSON III
BY Hans G. Hoffmeister
ATTORNEY

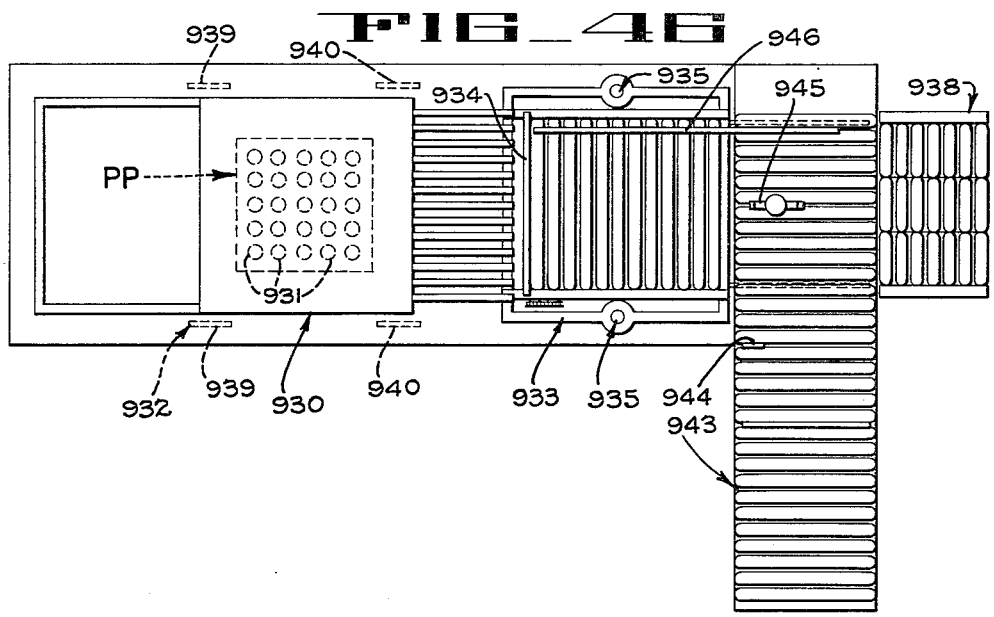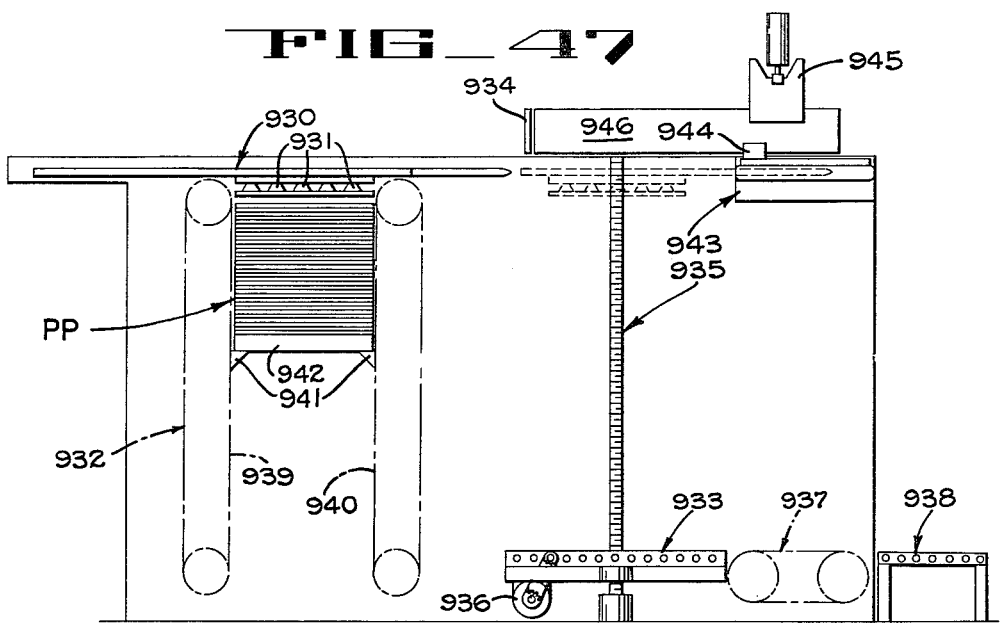

Aug. 21, 1962  E. J. McGRATH ETAL  3,050,199
APPARATUS FOR HANDLING CASES
Filed May 14, 1956  28 Sheets-Sheet 28
FIG_48
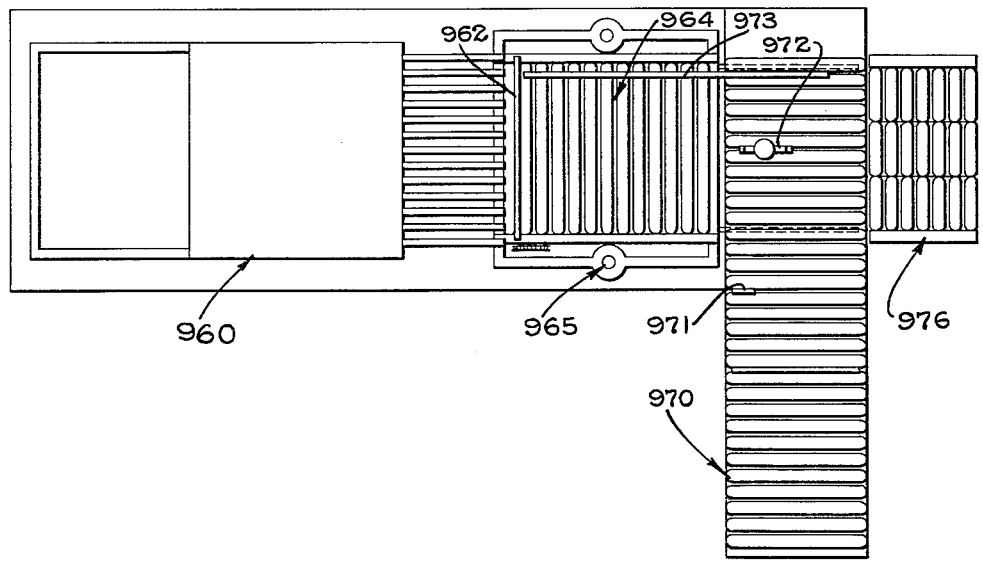
FIG_49
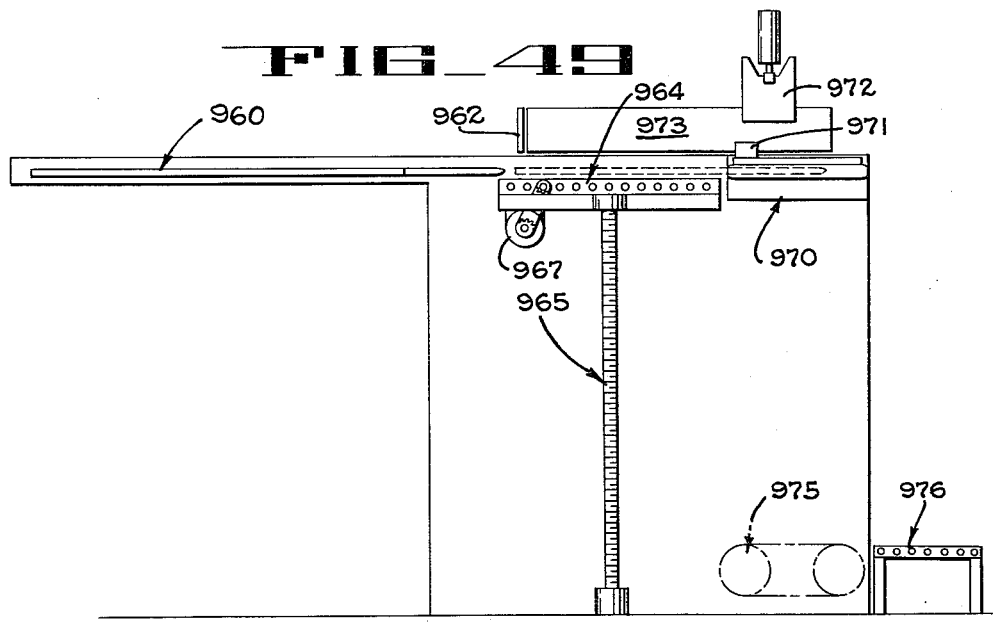
INVENTORS
EARLE J. McGRATH
CLARENCE H. STEVENSON III
BY *Hans G. Hoffmeister*
ATTORNEY

United States Patent Office 3,050,199
Patented Aug. 21, 1962

3,050,199
APPARATUS FOR HANDLING CASES
Earle J. McGrath, San Bernardino, and Clarence H. Stevenson III, Glendale, Calif.; said McGrath assignor to FMC Corporation, a corporation of Delaware
Filed May 14, 1956, Ser. No. 584,730
12 Claims. (Cl. 214—6)

This invention pertains to apparatus for handling boxes, cases or the like, and more particularly relates to an improved apparatus for arranging cases in predetermining formation on a support surface.

It is an object of the present invention to provide an efficient apparatus for arranging cases in interlocked formation on a support surface, such as a pallet.

Another object is to provide a mechanism for efficiently handling pallets in a case handling machine.

Another object is to provide an improved method of forming a layer of cases.

Another object is to provide an efficient case spacing mechanism for a case handling machine.

Another object is to provide coordinated case spacing and case orienting mechanisms adapted for arranging cases in a formation particularly suitable for a pallet of a predetermined size.

Another object is to provide an efficient automatic control system for a case handling machine.

Other and further objects and advantages of the present invention will become apparent from the following description taken in connection with the accompanying drawings, in which:

FIG. 1 is a diagrammatic plan view of a case handling machine constructed in accordance with the teaching of the present invention.

FIG. 2 is a diagrammatic side elevation of the machine of FIG. 1.

FIG. 3 is a plan of the machine of FIG. 1.

FIG. 4 is a vertical section taken longitudinally of the machine on line 4—4 of FIG. 3.

FIG. 5 is an enlarged fragmentary vertical section, with parts broken away, taken on line 5—5 of FIG. 4.

FIG. 6 is an enlarged horizontal section taken on line 6—6 of FIG. 4.

FIG. 7 is an enlarged fragmentary vertical section, with parts broken away, taken on line 7—7 of FIG. 4.

FIG. 8 is a fragmentary diagrammatic perspective of the machine of FIG. 1, with parts in section and parts broken away, to more clearly show the inner operating mechanisms.

FIG. 9 is an enlarged fragmentary perspective looking in the direction of arrow 9 of FIG. 4.

FIG. 10 is an enlarged fragmentary perspective looking in the direction of arrow 10 of FIG. 4 and particularly showing the stripper carriage on the top of the machine.

FIG. 11 is an enlarged fragmentary perspective looking in the direction of arrow 11 of FIG. 4, with parts broken away and parts in section.

FIGS. 12, 13, 14 and 15 are enlarged fragmentary sections taken on line 12—12 of FIG. 4, illustrating progressive steps in the latching of a pallet on the under surface of the stripper carriage.

FIG. 16 is an enlarged fragmentary horizontal section taken on line 16—16 of FIG. 4.

FIG. 17 is an enlarged fragmentary vertical section taken on line 17—17 of FIG. 4.

FIG. 18 is an enlarged fragmentary perspective, with parts broken away, looking in the direction of arrows 18—18 of FIG. 16.

FIG. 19 is a fragmentary perspective, with parts broken away, looking in the direction of arrows 19—19 of FIG. 16.

FIG. 20 is an enlarged vertical section taken along line 20—20 of FIG. 19.

FIG. 21 is a perspective, with parts broken away, of a portion of the mechanism of FIG. 19 shown detached from the assembled structure.

FIG. 22 is an enlarged fragmentary vertical section taken on line 22—22 of FIG. 3.

FIG. 23 is a fragmentary vertical section taken on line 23—23 of FIG. 22.

FIG. 24 is an enlarged vertical section taken on line 24—24 of FIG. 3.

FIG. 25 is a vertical section taken on line 25—25 of FIG. 24.

FIG. 26 is an enlarged fragmentary perspective, with parts broken away and parts in section, looking in the direction of arrows 26—26 of FIG. 3, particularly showing the elevating mechanism of the stripper loading conveyor.

FIG. 27 is an enlarged vertical section taken on line 27—27 of FIG. 3.

FIG. 28 is a fragmentary plan, looking in the direction of arrows 28—28 of FIG. 27.

FIG. 29 is an enlarged fragmentary vertical section taken along line 29—29 of FIG. 3, with parts broken away.

FIG. 30 is a fragmentary horizontal section taken on line 30—30 of FIG. 29.

FIG. 31 is an enlarged vertical section taken on line 31—31 of FIG. 3.

FIG. 32 is a fragmentary plan, with parts broken away, looking in the direction of arrows 32—32 of FIG. 31.

FIGS. 33 through 38 are diagrammatic illustrations of the formation of a load of cases on a pallet in accordance with the teaching of the present invention.

FIGS. 39, 40, 41 and 42, when arranged one above the other, form a composite diagram of the electrical control system used in the machine of the present invention.

FIGS. 43, 44 and 45 are diagrams showing the operation of a portion of the control circuit, with accompanying charts for identifying various operating positions.

FIG. 46 is a diagrammatic plan of a second embodiment of the case handling apparatus of the present invention.

FIG. 47 is a diagrammatic side elevation of the apparatus of FIG. 46.

FIG. 48 is a diagrammatic plan of a third embodiment of the case handling machine.

FIG. 49 is a diagrammatic side elevation of the machine of FIG. 48.

*General Arrangement*

In FIGURES 1 and 2, the reference numeral 50 indicates generally a form of the case handling machine of the present invention that is particularly adapted for loading cases on pallets. In this machine, the cases C to be palletized enter on a case feed conveyor 52 at the front of the machine while the pallets P are brought into the machine and stored in a magazine M at the rear by means of a fork lift truck or the like. In the magazine, the stack of pallets is periodically elevated by a conveyor 54 so that the topmost pallet is gripped by a mechanism on the under surface of a fork-like stripper carriage 56. The carriage 56 is mounted for reciprocating movement longitudinally of the machine and, at the beginning of an operation, wherein a layer of cases is formed on the carriage, the carriage removes a pallet P from the stack of pallets in the magazine M and carries it forwardly. During the remainder of the cycle, the stripper carriage 56 reciprocates between a position, shown in dotted lines in FIG. 2, where the fingers at the forward end of the carriage receive a line of cases C from a carriage loading conveyor 57, to a position intermediate the length of the machine above a table T carried by an elevator E. During each forward movement of the stripper carriage, the line or lines of cases already formed thereon are moved rearwardly on the carriage to make room on the carriage fingers for the next line. When a complete layer of lines of cases is formed on the carriage, the table T is elevated to remove the pallet from the under surface of the carriage, and then the carriage is returned to its rearmost position causing a transverse stripper bar 58 to strip the layer of cases from the carriage and deposit it on the pallet on the table T.

When a layer of cases has been placed on the pallet, the elevator E is automatically indexed downwardly a distance approximately equal to the height of one layer of cases so that the table is in a position to have a second layer deposited on top of the first layer. After the load has been built up of a predetermined number of layers, the elevator is lowered to a point where the loaded pallet is deposited on a discharge conveyor 60 which carries it out of the machine and onto a conveyor 62 which may be arranged to deliver the loaded pallet to a shipping room or the like.

The case feed conveyor 52 moves cases one at a time onto the carriage loading conveyor 57 which, in cooperation with a case turning unit 66 and an overhead case spacing mechanism 68, arranges the cases in a predetermined formation. A control panel 69 is conveniently located at the forward end of the machine.

Referring to FIGURES 3, 4 and 5, it will be seen that the frame of the machine 50 includes an upper longitudinal channel 71 and a lower longitudinal channel 72 at each side of the machine. The channels are connected by a plurality of rigid vertical structural members 73 (FIG. 4), which may be in the form of panels, and transverse horizontal members 74 to form a rigid box-like frame. The various members may be secured together in any suitable manner, as by welding or bolting. The rear end of the machine is closed by a panel 75 while the forward, or discharge end of the machine is left open so that the loaded pallets can be carried out of the machine.

*Pallet Magazine M*

Each side of the machine is enclosed along its entire length by a side panel 77 (FIG. 6) which is made up of a plurality of plates secured to the frame. Near the rear of the machine openings 78 and 79 are provided in the opposite side panels 77 to provide access to the pallet magazine M, which is defined by a rear transverse wall 80 and a forward transverse wall 81. As seen in FIGS. 5 and 6, the rear wall 80 is made up of three panels 83, 84 and 85, with a vertical opening 86 between the panels 83 and 84, and a similar opening 87 between the panels 84 and 85. Vertically disposed rollers 90 are mounted on the lateral edges of the panels to extend into the openings 86 and 87. The forward transverse wall 81 is made up of two panels 92 and 93 (FIGS. 6 and 7). The side edges of the wall 81 are spaced from the side panels 77 of the machine to provide vertical openings 95 and 96.

When a stack of pallets is brought into the magazine through the opening 78 (FIG. 6) by a fork lift truck, it is deposited on a pallet feed conveyor 99, which includes a pair of endless chains 100 and 101 (FIGS. 4 and 6) each of which is trained around a sprocket 103 on an idler shaft 105 and around a sprocket 106 keyed to a drive shaft 107. The shafts 105 and 107 are journalled in bearings 108 mounted on transverse channel members 109. The drive shaft 107 is driven by a chain 112 that is trained over a sprocket 113, keyed to the drive shaft 107 and over a sprocket 115 keyed to the driven shaft of a motor 117, which is secured to transverse frame members 118. Thus, when a stack of pallets is brought into the magazine M through the opening 78 (FIG. 6) and the motor 117 is energized, the stack is carried across the machine and into abutment with two vertical bars 120 (FIG. 4).

These bars 120 are welded at their upper ends to an angle bar 121 (FIG. 5) which is supported from brackets 122 by angle bars 123 that are adjustably bolted to slotted horizontal ledges 124 of the brackets 122. At their lower ends, each vertical bar 120 is welded to an angle bar 125 (FIG. 6) that is secured to a pair of spaced brackets 126, each of which has a lower plate portion 127 adjustably secured to a slotted support member 128 which is rigidly secured to and projects inwardly from one of the transverse channel members 109. Since the vertical bars 120 are adjustably mounted at their upper and lower ends, they may be moved laterally of the magazine to accommodate pallets of different sizes.

At predetermined intervals during the operation of the machine, the entire stack of pallets is elevated by means of the elevating conveyor 54 (FIG. 4) which comprises an endless chain conveyor assembly 136 projecting through the rear wall 80 of the magazine M and an endless chain conveyor assembly 137 projecting through the forward wall 81 of the magazine. The endless chain assembly 136 is best seen in FIG. 5 and comprises an endless chain 145 disposed in the opening 86 in the rear wall 80 and an endless chain 146 in the opening 87. At their lower ends, the chains 145 and 146 are trained around sprockets 147 (FIG. 4) keyed to an idler shaft 148 rotatably journalled in chain tightening mechanisms 149, that are adjustably mounted on a transverse frame member 150. At their upper ends, the chains 145 and 146 are trained around sprockets 152 (FIG. 5) keyed to a drive shaft 153. At each end, the shaft 153 is journalled in a suitable bearing plate (not shown) which is secured to the inner surfaces of the side panels 77 of the machine, and a sprocket 155 (FIG. 8) is keyed to the shaft adjacent the inner faces of the bearing plates. At the pallet-entry side of the machine (FIG. 5), the shaft 153 projects through the wall to receive a sprocket 158 in keyed relation thereon. The shaft 153 is driven from a motor 160 (FIGS. 3 and 8), which is securely mounted on the top wall 159 of the machine, through a chain 161 that is trained over the sprocket 158 and over a sprocket 162 keyed to the motor shaft.

Each of the endless chains 145 and 146 carries two substantially identical spaced lifter lugs or support members 164 and 165 (FIG. 4). As seen in FIG. 9, each lug is in the form of an angle member having legs 166 and 167 with a brace 168 extending between the legs. Each lifter lug is mounted on the chain by two L-shaped brackets 170 which are secured to the leg 166 of the lug and to special mounting links 171 of the chain. The chain slides along a T-shaped vertical guide bar 172 (FIGS. 6 and 9), which has a cross bar 173 in contact with the chain and a stem 174 secured to vertically spaced transverse frame members 175 by bolts 176. In order to prevent the inward tilting of the lifter lug when a load is placed thereon, a roller 178 is secured by means of a bolt 179 to one arm of each L-shaped bracket 170 and projects behind the cross bar 173 of the T-shaped guide bar 172. Thus, as a loaded lifter lug moves upward, it is held against tilting and inward swinging movement by the stationary T-shaped guide bar. It will be noted in FIG. 5 that the lifter lug 164 on chain 145 is in lateral alignment with the lug 164 on chain 146, and the lugs 165 are also in lateral alignment. With this arrangement, each pair of aligned lugs cooperate to support one side of the stack of pallets while the other side of the stack is supported in a manner to be described presently.

The endless chain assembly 137 (FIG. 7) comprises two spaced endless chains 190 and 191, each of which has an upper end portion trained around a sprocket 193 keyed on a rotatable stub shaft 194, together with a sprocket 195. Each chain has a lower end portion trained around a sprocket 197 (FIG. 8) that is rotatably mounted on an idler shaft 198 carried in chain tightening mechanisms 200 (FIG. 4). The chain tightener 200 is adjustably mounted on a fixed transverse frame member 201.

The two chains 190 and 191 cooperate to support two elongated, transversely disposed lifter flights or support members 204 and 205. Each lifter flight (FIGS. 4 and 6) comprises an elongated body portion 206 of angular cross-section which is secured to the chains 190 and 191, and held in guided and supported relation against fixed T-shaped vertical frames 203 in identically the same manner as the chains 145 and 146 are mounted on the T-shaped guides 172. In addition, each of the lifter flights 204 and 205 has a pair of laterally spaced pallet contact lugs 208 which extend inwardly of the magazine a distance sufficient to be disposed under a stack of pallets in the magazine. As seen in FIG. 4, the lifter flight 204 on chain assembly 137 is directly opposite the pair of lifter lugs 164 on the chain assembly 136 and cooperate therewith to engage under and lift a stack of pallets.

The stub shafts 194 (FIG. 8) are driven from the drive shaft 153 by chains 210 and 211 each of which is trained around a previously-mentioned sprocket 155 keyed to the shaft 153 and the sprocket 195 keyed to the drive shaft 194. In order that the inner runs of the endless elevator chains travel in the same, that is, in an upward direction, the cross chains 210 and 211 are twisted and are guided intermediate their length on idler sprockets 216 and 217 which are rotatably mounted on fixed stub shafts 218.

In summary, a stack of empty pallets is deposited on the endless chains 100 and 101 (FIG. 4). When the motor 117 is energized, the stack is carried across the machine and into abutment with the vertical posts 120. Then, the next time the motor 160 is energized, either the litfer lugs 164 and the lifter flight 204, or the lugs 165 and the flight 205 will move up under the stack of pallets and elevate them toward the reciprocating stripper carriage 56 which is arranged to remove only the top pallet from the stack and carry it forwardly to the table T, as will be explained presently.

As the stack of pallets is elevated in the magazine M, the pallets are centered and retained in a compact pile by the vertical guide bars 120, a pair of inclined guide brackets 220 (FIGS. 4 and 7) that are mounted in fixed position adjacent the top of the forward wall 81 of the magazine M, a pair of inclined guide brackets 221 (FIGS. 4 and 5) mounted in fixed position adjacent, the top of the rear wall 80, and a pair of inclined guide brackets 222 and 223 (FIGS. 5 and 7) mounted on fixed brackets 224 and 225, respectively, which are disposed above the pallet entrance portion of the magazine.

*Stripper Carriage*

The stripper carriage 56 (FIGS. 3 and 10) comprises a generally rectangular flat rigid plate 250 having a plurality of rigid fingers or tines 251 secured on and projecting forwardly from the forward edge. At each edge of the plate 250, an elongated rack 253 is secured to an angle bar 254 that is welded to the plate 250. One leg 254a of each angle bar 254 is disposed in sliding, guided contact with the inner edge of the lower flange of either of the upper frame channels 71. The angle bars 254 extend rearwardly beyond the end of the plate portion 250 and are connected by a transverse bar 255. The racks 253 are in driven engagement with pinions 260 keyed to a drive shaft 261 which is rotatably journalled in fixed bearing plates 262 and is driven through a sprocket and chain arrangement 264 (FIG. 3) from a reversible motor 266 that is mounted on top of the machine on a plate 267 secured to fixed frame members 268.

The stripper carriage 56 is mounted for reciprocating movement longitudinally of the machine on rollers 280 (FIG. 12) each of which is rotatably mounted on a stub shaft 281 secured in the depending leg 254a of the angle bar 254. As seen in FIGS. 4 and 10, two rollers 280 are disposed at the forward end of the plate portion 250 of the stripper plate and two rollers 280 are disposed between the rear of the plate portion 250 and the cross bar 255. Each roller 280 rolls along the upper surface of the lower flange of one of the channels 71 and is prevented from moving upwardly away from the flange by an elongated guide bar 285 (FIG. 12), one of which is mounted in each channel 71 by a plurality of spaced blocks 286. The blocks 286 are adjustably secured to the channel by bolts 287 which engage the top surface of the blocks and by bolts 288 which extend through vertical slots (not shown) in the channel 71 to engage and hold the blocks in adjusted position.

As seen in FIGS. 7 and 11, two latching assemblies 300 and 301 are mounted on the underside of the plate portion 250 of the stripper plate 56 for the purpose of removing the top pallet from the stack. The latching assemblies are identical but are oppositely disposed. A description of latching assembly 300 will clearly explain the construction of assembly 301 and identical parts on the two assemblies will be given identical reference numerals. The latching assembly 300 (FIG. 11) comprises a bar 303 secured, as by welding, to the under side of the plate 250 and extending generally longitudinally of the machine. A bifurcated hanger 306 is pivotally mounted in recesses 307 at each end of the bar 303. The hangers 306 are rigidly secured together by a bar 308 that is welded to the inner side face of each hanger. A generally triangularly-shaped latch member 310 is pivotally mounted on a pin 311 in each bifurcated hanger 306, and pivoting movement of the latch 310 in one direction is limited by a plate 312 (see assembly 301 in FIG. 11) that is welded to the latch 310 and arranged to abut the edges of the legs of the bifurcated hanger. A spring 315 is connected between the hanger 306 and the plate 312 and normally pivots the latch 310 in a direction to move the plate into abutment with the hanger. In this spring-urged position, a flat edge 316 of the latch 310 is in a generally horizontal position and a prong 317 fixed thereon projects upwardly. Three springs 320 (FIGS. 10 and 12) are anchored at their upper ends in brackets 321 which are secured to the upper surface of the stripper plate 250. The springs 320 extend downwardly through openings 322 in the plate 250 and are connected at their lower ends to the bar 308 which extends between the hangers 306. Thus, as seen in FIG. 12, the springs 320 at all times urge the latch assemblies 300 and 301 in a pivoting movement in a direction to bring a pair of spaced rollers 328 (FIG. 11), which are secured to the rigid bar 303 of each assembly 300 and 301, into contact with a curved camming member 330 (FIG. 12). Each camming member 330 has a rearmost portion 330a (FIG. 11) of angular configuration, with one leg of the angle rigidly secured to the fixed brackets 122 and the other leg providing a vertical camming surface of a length sufficient to simultaneously engage both rollers 328 of the associated latch assembly and hold the assembly in a position wherein the rigid bar 308 and the hangers 306 are in generally vertical position. Each camming member 330 has a curved, straplike forward end portion 330b (FIG. 12) which is curved in such a manner that the associated assembly is permitted to pivot outwardly toward the side walls of the machine, as seen in FIG. 15, as the stripper carriage 56 is moved toward the front of the machine, for a purpose which will be explained presently.

When the stripper carriage 56 is in its rearmost position, as in FIG. 4, the two latching assemblies 300 and 301 are disposed directly above the stack of pallets in the magazine M. Then, when the stack is elevated, the spring loaded latching assemblies will automatically engage under and remove the top pallet from the stack in the manner illustrated in the progressive illustrations, FIGURES 12, 13 and 14. In FIG. 12, the top pallet P′ has just contacted the four latch members 310. As the stack is raised higher, the latches 310 swing outwardly about pin 311 against the resistance of the springs 315, permitting the upper bars of the pallet to reach a position above the latches 310. The springs 315 then swing the latches 310 into position under the upper bars of the pallet. At this point, the upward movement of the stack is stopped, through a control mechanism that will be explained hereinafter, and the stack is lowered. The top pallet P' is caught on the prongs 317 of the latch members so that, when the stripper carriage 56 is moved forwardly, it carries the pallet P' with it. As the carriage moves forward, the rollers move onto the forward, outwardly curved portion 330b of the camming member 330. However, since the prongs 317 of the latches are embedded in the pallet, the latches cannot follow the cam surface and swing outwardly. It is to be noted that if the pallet is lifted upwardly away from the prongs, the latches will be automatically swung outwardly by the springs 320.

*Pallet Discharge Elevator*

The elevator E (FIG. 4) is mounted for vertical raising and lowering movement in a chamber or shaft that is disposed forwardly of the front wall 81 of the magazine M. The table of the elevator comprises two spaced channel members 333 and 334 (FIG. 16) which extend transversely of the machine and are connected by four spaced channels 335, 336, 337 and 338 which are welded to the top surfaces of the transverse channels 333 and 334 to provide a rigid frame table structure. The ends of the table are formed by two built-up channels 339 and 340 which are also welded between the side channels 333 and 334. The table is raised and lowered by means of two power screws 341 and 341a (FIG. 17). Each of the screws 341 and 341a is rotatably journalled at its upper end in a bracket 344 (FIG. 19) which is secured to and projects inwardly of the machine from a pair of spaced vertical guide bars or ways 346. Near its lower end, each power screw is journalled for rotation in a thrust bearing 348 (FIG. 18) which is mounted in a plate 349 that is secured between short angle bars 350 and 351 extending between a frame channel 72 (FIG. 17) and a rigid support channel 353 that extends longitudinally of the machine. A pair of drive gears 355 and 356 (FIG. 17) are keyed to the power screw 341a immediately below the thrust bearing 348. A driven gear 365 is keyed to the power screw 341 immediately below the thrust bearing 348, and the gear 365 is driven from the screw 341a by a rubber belt 367 that has teeth on its inner surface that mesh with the teeth of the gears 355 and 365. The belt 367 is trained around the gears 355 and 365 and around two idler gears 369 (FIG. 16) each of which is keyed to a shaft 370. As seen in FIG. 17, each shaft 370 is rotatably journalled in spaced bearings 372 and 373 that are supported in a fixed bracket 374 secured on a longitudinal angle bar 375. It will therefore be evident that when the power screw 341a is rotated, the screw 341 is also rotated through the belt 367. The power screw 341a is driven through a rubber belt 377 (FIG. 16) which has teeth in mesh with the gear 356 on the screw 341a and in mesh with a gear 378 keyed to the shaft of a motor 380 (FIG. 16) which is mounted on the outer wall of the machine on a bracket 381.

Rotation of the power screws brings about the raising or lowering of the table T through split lifting nuts 383 and 384 (FIG. 17) which are formed in the end channels 339 and 340, respectively, of the table. These nuts are exactly alike and, accordingly, a detailed description of nut 383 will fully disclose the structure of nut 384. The nut 383 (FIG. 19) comprises two semi-cylindrical internally-threaded members 386 and 387 that are secured around the power screw 341 by capscrews 390. Each of the semi-cylindrical members has a flange 391 integrally formed on the lower end thereof and these two flanges 391 have diametrically opposite flattened side faces 392 and elongated recesses 393 adjacent the lower edge of the faces. The split nut 383 is disposed in an opening formed between two plates 395 which are welded between aligned end portions 339a and 339b of the built-up end channel 339. A flat collar 399 (FIG. 21) is rigidly secured, as by welding, in recesses 400 in the lower portion of each plate 395. When the nut 383 is disposed in the collar 399, the flat circular under surface of the collar 399 is in contact with the upper flat ledges of the flanges 391. To lock the nut 383 to the plates 395 so that vertical movement of the nut causes a corresponding vertical movement of the table, an L-shaped locking member 404 (FIG. 20) is disposed in each elongated recess 393 in the lower surface of the flanges 391 of the nut 383. Each locking member 404 is secured to the under surface of the collar 399 by capscrews 405 (FIG. 20) so that the flange of the nut is locked to the collar 399. Accordingly, the nut 383 is prevented from rotating with the power screw 341 and, when the nut is moved vertically due to rotation of the power screw, the table is also moved vertically. The table is guided in this vertical movement by sliding blocks 407 (FIG. 19), one of which is secured to the outermost plate 395 at each end of the table. Each block has a rib or tongue 408 that is disposed in the guideway formed by the two vertical bars 346 secured to each inner side wall of the machine. The use of split nuts provides an arrangement whereby the nuts may be easily replaced after they become worn.

When the table T approaches its lower most position, it deposits the loaded pallet on a pallet discharge conveyor 60 (FIG. 16). It will be noted that the channels 335 and 336 of the table structure pass downwardly on opposite sides of an endless conveyor chain 410 of the conveyor 409, and the channels 337 and 338 pass downwardly on opposite sides of an endless conveyor chain 411. When the table is below the surface of the conveyor chains 410 and 411, a pallet being lowered by the table will be deposited on the conveyor chains. The conveyor chains 410 and 411 are trained around idler sprockets 413 journalled on a shaft 414 and around sprockets 415 keyed to a shaft 416 which is driven from a shaft 418 through a chain and sprocket arrangement 420. The shaft 418 is driven from a shaft 421 through a pair of endless conveyor chains 422 and 423 which are trained around sprockets 425 keyed to the shaft 418 and around sprockets 426 keyed to the shaft 421. A motor 428 drives the shaft 421 through a sprocket and chain drive arrangement 430. Accordingly, when a pallet is deposited on the chains 410 and 411 by the elevator, and the motor 428 is energized, the pallet will be carried to the right, as seen in FIG. 16, by the chains 410 and 411 and will be transferred to the chains 422 and 423 which will, in turn, transfer the pallet to the discharge conveyor 62. The discharge conveyor 62 may be of any commercial type, as for example, a gravity roller conveyor.

*Case Feed Conveyor*

As seen in FIG. 3, cases to be loaded on a pallet are carried into the machine, in a direction transversely of the machine, by the case feed conveyor 52 which is mounted in an elevated position adjacent the front of the machine. The conveyor 52 comprises a plurality of driven rollers 450 (FIG. 24) rotatably mounted in a support frame 451, which includes an angle bar 452 (FIG. 25) and a channel 453. The bar 452 and the channel 453 are secured by suitable braces to the upper portion of the frame of the machine and extend laterally therefrom to provide an elevated conveying surface that is substantially on a level with the top of the stripper carriage 56. Referring to FIGURES 3 and 22, the rollers 450 include two rollers 450a and 450b that are positively driven from a motor 455 through a chain 458 that is trained around a sprocket 454 on the motor shaft and around sprockets 456 and 457 on the rollers 450a and 450b, respectively. The motor 455 and its gear reducer 459 are mounted on the inner face of one of a pair of side plates 460 which extend from the side of the machine to the under side of the case feed conveyor. The rollers 450a and 450b drive the remaining rollers through rubber belts 462 and 463, respectively, that mesh with a gear 464 keyed to each roller. Since the sprocket 456 on roller 450a is smaller than the sprocket 457 on roller 450b, the belt 462 will travel faster than the belt 463 and, therefore, the rollers driven by belt 462 will form an accelerator conveyor section.

A case stop plate 465 (FIG. 22) is mounted transversely of the case feed conveyor between two of the rollers 450 of the accelerator section. The stop plate 465, which is of a width substantially equal to the width of a case being fed into the machine, is mounted on a lever 466 pivotally mounted on a transverse support bar 467. A pneumatic cylinder 470 has a plunger 471 pivotally connected to the lever 466 to control the movement of the case stop plate 465 from the position below the surface of the rollers 450, as seen in FIG. 22, to a position above the surface and in the path of cases being advanced by the case feed conveyor.

A pair of case guide members 475 and 476 (FIG. 3) are mounted over the rollers 450 along one side of the feed conveyor 58. The guide 475 is supported in fixed position from the angle bar 452, while the guide 476 is supported inwardly of the guide 475 on a bracket 477. Another longitudinal guide 478 (FIG. 24) is mounted opposite the guides 475 and 476 on two rods 479 and 480 which extend across the case feed conveyor parallel to the conveyor rollers 450 and are secured between the angle bar 452 and the channel 453. A sleeve 481 (FIG. 25) is adjustably secured on each bar 479 and 480 and each sleeve has an upwardly projecting flange 482 that is welded to the under surface of the guide 478. With this arrangement, the guide 478 may be adjusted transversely of the feed conveyor to accommodate cases of different sizes.

An auxiliary guide lever 484 (FIGS. 24 and 25) is pivotally mounted on the guide 478 by a pin (not shown) that is rotatably disposed in a sleeve 486 secured to the guide 478. The lever 484 has end portion 484a extending over the rollers 450 and carrying a plurality of small upper and lower guide wheels 487. A spring 488 (FIG. 25) is connected between the guide lever 484 and a rigid arm 490 extending laterally from the guide 478. The spring 488 urges the lever in a direction to swing the guide wheels 487 into the path of cases on the conveyor and to bring a stop arm 489 (FIG. 25) of the lever 484 against an abutment surface of the guide 478.

A support plate 491 (FIG. 25) is also mounted directly above the rollers 450 alongside the guide 478 by sleeves 492 (one only being shown) which are adjustably secured to the transverse rods 479 and 480. The support plate mounts one element of a photoelectric unit which is part of the automatic control system of the machine that will be fully explained hereinafter.

*Case Turning Mechanism*

It has been found that the stability of a load of cases can be increased if the cases in one line of a layer of cases are arranged differently than the cases in the adjacent line. As seen in FIG. 1, in the first two lines of cases of the layer of cases on the stripper carriage, the cases have the same orientation in the layer as they had on the case feed conveyor. On the other hand, the cases of the third row have been rotated 90° to their original position. This 90° turning of the cases in the third line is obtained by means of a case turning plate 496 (FIGS. 22 and 23) which is part of the unit 66 and is mounted at the discharge end of the accelerator section of the case feed conveyor 52 in a pair of spaced vertical guideways 493 (FIG. 23) that are bolted to a transverse angle bar 494 of the frame structure of the feed conveyor. The turning plate 496 is mounted for movement from an elevated, case-intercepting position, shown in dotted lines in FIG. 22, to the full line lowered position wherein the top of the turning plate is below the upper surfaces of the rollers 450. The turning plate is raised and lowered by means of a double-acting pneumatic cylinder 495 that is supported by studs 495a from transverse frame members 497. The piston rod 498 (FIG. 23) of the pneumatic cylinder is connected by a pivot pin 499 to a yoke 499a that is welded to the lower surface of the turning plate 496. As seen in FIG. 3, the turning plate 496 is positioned adjacent a side edge of the case feed conveyor 52 and has an effective width that is only a fraction of the width of a case being advanced on the case feed conveyor. Accordingly, if the turning plate is in its elevated position, a case will engage the plate and be turned 90° as the power driven rollers 450 continue to advance the case.

*Stripper Loading Conveyor*

The case feed conveyor 52 delivers cases one at a time onto the stripper loading conveyor 57 which comprises a plurality of rollers 500 (FIG. 26) that are rotatably journalled at one end in a channel 501 and at the other end in an angle bar 502. The channel 501 and the angle bar 502 are secured together by a plurality of rigid connector angle bars and straps 503 to form a rigid frame 504. The entire frame 504 is movable from a raised position wherein the top surface of the rollers is above the level of the upper surface of the fingers of the stripper carriage 56 to a lowered position wherein the top surfaces of the rollers are below the support surface of the stripper carriage fingers. A stripper plate 505 is secured in parallel relation to one side face of the angle bar 502. The cases are formed on the stripper loading conveyor when the frame 504 is in the elevated position and the fingers of the stripper carriage are disposed between and slightly below the rollers of the conveyor. Then, when the conveyor is lowered, the cases are deposited on the stripper carriage fingers for subsequent movement rearwardly toward the table T.

The stripper loading conveyor 57 is raised and lowered by means of a double-acting pneumatic cylinder 510. The cylinder 510 is pivotally mounted at one end by a pin 511 which is disposed in a short arm 512 of a rigid frame 513 mounted between angle bars 514 and 515 of the frame structure of the machine. A piston rod 516, projecting from the free end of the cylinder 510, carries a yoke 517 which is pivotally connected by pin 518 to one corner of a triangular plate 519. Another corner of the plate 519 is pivotally secured by a pin 520 between two brackets 521 and 522 which are rigidly supported on structural members 523 and 524 of the rigid frame 513. The triangular plate 519 is also pivotally connected, by pin 525, to two identical parallel straps 526 which are secured to a short arm 528 that projects downwardly from an angle bar 530. The angle bar 530 is welded to the top surfaces of two of the connector angle members 503 of the stripper loading conveyor frame 504. Four identical lifter arms 531, 532, 533 and 534 extend between the frame of the machine and the conveyor frame 504. As shown in connection with lifter arm 532, each lifter arm is pivotally mounted at one end between two rigid frame members 536 and 537 and at the other end between blocks 538 and 539 secured to the conveyor frame. Accordingly, when pressurized air is directed to one end of the pneumatic cylinder 510, the piston rod 516 is moved outwardly of the cylinder, the triangular plate 519 is pivoted in a clockwise direction (FIG. 26) about the pin 520, and the entire conveyor frame 504 is swung upwardly on the pivoting lifter arms 531, 532, 533 and 534.

The rollers 500 of the stripper loading conveyor are simultaneously driven by a toothed rubber belt 540 (FIG. 27) which is trained around a gear 541 keyed to each roller and around a gear (not shown) keyed to a drive shaft 544 that is rotatably journalled in the conveyor frame 504 and is disposed generally parallel to the rollers 500. The drive shaft 544 is driven, through a sprocket and chain drive arrangement 546, by a motor 547 that is also mounted on the conveyor frame 504 at one end thereof. It will be noted in FIG. 27 that three conveyor rollers 500a, 500b, and 500c are not driven, but are freely rotatable. Therefore, when cases are carried across the rollers of the stripper loading conveyor, they will be slowed down when they are moved onto the undriven rollers. Also, if it is desirable to disconnect any of the normally driven rollers, the rubber belt 540 may be trained over the top of one of a series of short idler rollers 550 that are mounted in the channel 501 of the frame 504 adjacent the drive ends of the rollers.

In FIG. 3, it will be seen that the leading case carried across the stripper loading conveyor 57 will come to rest against a plate 555 of a case stop unit 554. The plate 555 extends part way across the conveyor 57 and across that portion of the machine that is directly above the pallet elevator E. The plate 555 has a channel-shaped cross-section (FIG. 27) and is disposed over a similar channel-shaped plate 556 to which it is pivotally connected at one end 555a (FIG. 28) by a pin 559. The pin 559 extends entirely through the flanges of the channel plates 555 and 556 and is held therein by cotter pins or the like. At its opposite end 555b the outer channel plate 555 is adjustably secured to the inner channel plate 556 by a pair of studs 560 (FIGS. 27 and 28) which are welded to the inner plate 556 and extend through slots 562 (one only being shown in FIG. 28) in the outer channel plate 555. Nuts 563 are threaded on the studs to lock the plates in adjusted position. With this arrangement the end 555b of the plate 555 may be adjusted a short distance relative to the inner plate 556.

Since each line of cases formed on the conveyor 57 must be centered relative to the pallet on which it is to be deposited, and since the length of each line will vary in accordance with the size of the cases being handled, it is necessary that the plate 555 be adjustable in the direction of movement of the cases on the stripper loading conveyor 57. For this purpose, the inner plate 556 is welded to the end faces of two spaced blocks 558 (FIGS. 27 and 29), each of which is threaded on the end of an adjusting screw 565 and secured thereon by a setscrew 566. Vertical support plates 567 are welded to the sides of each block 558 and to the inner surfaces of the inner channel plate 556, as seen in FIG. 27. Each adjusting screw 565 is threaded in a sleeve 570 which is journalled for rotation in a stationary bushing 571 that is supported on the under side of an upturned channel 574 which extends from an end support channel 575 (FIG. 3) of the machine frame structure to a channel 576 that is secured transversely of the machine between the longitudinal frame structure channels 71. The bushing 571 (FIG. 27) is secured to the upturned channel 574 by bolts 578. The rotary sleeve 570 is retained in the bushing 571 by a collar 579 secured to the sleeve by a setscrew 580 at one end and by a sprocket 581 that is welded to the other end of the sleeve. When the sleeves 570 are rotated, the screws 565 are moved in or out of the rotary sleeves 570 to effect adjusting movement of the plate 555.

The sleeves 570 are rotated by means of a chain 582 (FIG. 29) that is trained around the sprockets 581 on the sleeves and around a sprocket 583 keyed to the shaft of a reversible motor 584 that is pivotally mounted by a pin 585 on a post 586 projecting upwardly from the upturned channel 574. An adjusting screw 588 is threaded through the motor mounting plate and engages the upper surface of a short channel 589 that is secured to the channel 574. This adjustable mounting of the motor 584 provides means for tightening the chain 582. It will be recognized that when the motor 584 is energized, the plate 555 will be adjustably moved back or forth over the stripper loading conveyor 57 to a selected position that will cause the line of cases to be centered relative to the pallet on which it is to be deposited. The pivotal mounting of the outer channel plate 555 on the inner channel 556 permits an additional adjustment of the plate 555 relative to the conveyor 57. It is also evident that the plate 555 acts as a guide rail to hold the line of cases in centered position relative to the pallet as the line of cases is carried rearwardly by the stripper carriage.

The first line of cases carried rearwardly by the stripper carriage comes into contact with the stripper plate 58 (FIGS. 3 and 4) of a stop unit 596. The plate 58 extends transversely of the machine and is mounted for adjustment in a direction longitudinally of the machine on two power screws 591 and 592. Each of the screws 591 and 592 carries a block 593 (FIG. 8) which is welded to a transverse angle bar 594 which, in turn, is welded to the rear face of the plate 58. The screws 591 and 592 are mounted for adjusting movement on the transverse channel 576 in exactly the same manner as explained in connection with the adjustable mounting of screws 565, and a reversible motor 597 mounted on the channel 576 drives the rotary sleeves (not shown) through a chain 598. The stripper plate 58 is therefore arranged to be moved to different positions over the pallet on the elevator E to provide for changes in the size of the cases.

The position of the case stop plate 555 is automatically adjusted in accordance with the type of case being handled. This adjustment is effected through a cam 600 (FIGS. 29 and 30) that is mounted on an angle plate 601 which has a leg 601a bolted to a plate 602 secured between the flanges of the channel-shaped inner member 556. When the motor 584 of the stop plate 555 is energized, the cam 600 traverses a series of switches Sw31 through Sw36 (FIG. 29) which are mounted in depending position from a bracket 603 secured to the fixed stationary channel 574. It will be noted in FIG. 30 that the switches are arranged in a staggered formation so that the cam 600 will contact the rollers of the switches at different times to actuate control circuits which are effective to stop the motor 584. Therefore, the adjusted position of the stop plate 555 will be controlled by the closing of whichever switch is connected in the control circuit that was previously selected by the operator. The control circuits will be explained in detail hereinafter.

The position of the stripper plate 58 is also controlled by cam actuated switches (not shown) which are adjustably mounted in a staggered, fixed formation on the channel 576 and are arranged to be actuated by a cam carried by the stripper plate 58. The operation of these switches will be explained in connection with the electrical control system.

*Case Spacing Mechanism*

Referring to FIG. 1, it will be noted that, due to the fact that most cases are longer than they are wide, it is necessary, when cases are disposed lengthwise in a row, to space one case in a row a predetermined distance away from the adjacent case in the row. Specifically in row 1, case C1 has been spaced from adjacent case C2. This spacing of cases is accomplished in the present invention by a case spacing mechanism 68 which, as seen in FIGS. 3 and 4, is mounted above the stripper loading conveyor 57 on a frame support structure 604. The structure 604 (FIG. 32) comprises a channel 605 extending along one side of the conveyor 57 and supported in spaced relation above the top of the machine by two vertical angles 606 which are rigidly secured to the longitudinal frame members 71. At the other side of the conveyor 57, a channel 607 is supported in spaced relation above the top of the machine on two vertical angles 608 which project upwardly from and are secured to the upper flange of the end frame channel 575. The channels 605 and 607 of the case spacing mechanism are connected by two angle bars 609 (FIG. 32) to provide the rigid, elevated support frame 604 for the spacing mechanism. The case spacing mechanism includes an inner frame 610 made up of spaced angle bars 611 and 612 which have upstanding legs connected by bars 613 and 614. A block 616 is secured by bolts (not shown) between the angle bars 611 and 612 at each end thereof, and a screw 618 is threaded through each block. The screws 618 are rotatably mounted in bearings 620 projecting from the end members of the support structure 604. The screws 618 are rotated by a motor 625 (FIG. 32) through a chain 626 that is trained around a sprocket 627 keyed to each screw and around a sprocket 628 keyed to the motor shaft. The motor 625 is secured to a plate 630 (FIG. 31) that is adjustably supported at one end on the end of a bolt 631 that is threaded through a fixed angle bar 631a. At its other end, the motor mounting plate 630 is welded to a sleeve 632 (FIG. 32) that is rotatably mounted on a rod 633 secured between the angle bars 609. The pivotal mounting of the motor plate 630 provides means for tightening the chain 626. When the motor 625 is energized, the screws 618 are rotated and the movable inner frame 610 is moved relative to the fixed frame 604.

A case-intercepting blade 635 (FIG. 31) is mounted on the movable inner frame 610 at the lower end of a double-acting pneumatic cylinder 637 that is pivotally mounted near the upper end of a support structure 638 comprising four spaced vertical angle bars 639 (FIG. 32) that are bolted to the angle bars 611 and 612 and project upwardly therefrom. At its side edges, the blade 635 carries bars 640 and 641 that are guided in slots in the braces 613 and 614. When pressurized air is directed into the cylinder 637 above the piston therein, the blade 635 is forced downwardly to the dotted line position of FIG. 31 to arrest the movement of a case being advanced across the stripper loading conveyor 57. Since the position of blade 635 relative to the conveyor 57 may be varied by adjusting the inner movable frame 610, it is evident that the spacing between cases in a line may be varied to obtain a desired spacing of cases.

The position of the inner movable frame 610 is automatically adjusted by energizing the motor 625 to actuate the power screws 618. A cam plate 648 (FIGS. 31 and 32), which is mounted on one of the blocks 616 of inner movable frame 610, traverses a series of switches Sw23, Sw24, and Sw25 and closes each switch successively. As will be explained in connection with a description of the electrical control circuit, the frame 610 will be stopped in a predetermined position depending upon which switch was connected in the circuit when the control circuit was selected before the operation began.

*Location of Elements of Control Circuit*

The operation of the pallet loading machine of the present invention is automatically controlled through several switches and photo-electric control units that are actuated by moving parts of the machine or by the cases being handled in the machine. A normally open switch Sw1 (FIGS. 3 and 31) is mounted on the top flange of the longitudinal frame channel 71 near the turning plate 496. The switch Sw1 has an actuator arranged to be contacted by a cam 655 secured to the stripper carriage rack 253 when the stripper carriage 56 is in its forward position with the fingers 251 disposed between the rollers 500 of the stripper loading conveyor 57.

A normally open switch Sw2 (FIG. 10) is supported from a bracket 656 which is secured to the top flange of the longitudinal channel 71 and has an actuator arranged to be contacted by a cam 656a secured to the side of the rack 253. A multi-contact switch Sw3 (FIGS. 3 and 10) is mounted on the under side of a bracket 657 that extends from the structural cross-brace 74 at the rear of the machine. The switch Sw3 has an actuator arranged to be contacted by a small cam 658 secured adjacent the rear end portion of the rack 253.

A normally closed switch Sw4 (FIGS. 3 and 10) is located in the rear portion of the machine above the pallet magazine M. The switch Sw4 is mounted on a bracket 659 which is secured to a longitudinal channel member. The switch actuator is arranged to be actuated by the same cam 656a on the rack 253 that actuates switch Sw2. A multi-contact switch Sw5 (FIG. 10) is also located in the rear portion of the machine, being secured to a strap 660 extending between two transverse frame members 74. The actuator of switch Sw5 is arranged to be contacted by a camming flange 661 of a bar 662 extending between the end angle member 255 of the stripper plate frame and the plate portion 250.

A normally open switch Sw6 is located at the front of the machine as seen in FIGURES 3 and 22 immediately below the entrance end of the stripper loading conveyor 57. The switch Sw6 is mounted on a bracket 663 that is secured to the angle bar 515 of the frame structure of the machine. The actuator of switch Sw6 is arranged to be contacted and closed by the lower edge of one of the connector straps 503 of the depressible stripper loading conveyor as the conveyor is moved downwardly to deposit cases on the stripper carriage fingers.

A normally open switch Sw7 (FIGS. 16 and 17) is mounted on a bracket 664 secured to the under side of the channel 336 of the elevator table T. The actuator of switch Sw7 normally projects above the top surface of the channel 336 so that it is actuated by a pallet deposited on the table.

A multi-contact switch Sw8 (FIGS. 16 and 17) has a bracket 665 secured to a side wall panel of the machine. The actuator of switch Sw8 is arranged to be contacted by a short bar 666 secured to one corner of the elevator table when the table is in its lowermost position.

A multi-contact switch Sw9 (FIGS. 16 and 17) is mounted on a bracket 667 which is secured by bolts 667a to a wall panel 668 near the lower portion of the front of the machine. The switch Sw9 has an actuator 668a that projects out over the chain 423 that carries the loaded pallet out of the machine. As seen in FIG. 17, the actuator is at a lever to be contacted by the pallet itself.

A normally closed switch Sw10 (FIGS. 16 and 17) is positioned in the elevator shaft and has a bracket 669 secured to a vertical frame member 73. The actuator of switch Sw10 is arranged to be contacted, when the elevator table is in an upper position, by a short bar 670 secured to one corner of the elevator table T.

A normally open switch Sw11 (FIGS. 4 and 9) is positioned just above the upper end of the rear wall 80 of the pallet magazine M. The switch Sw11 is mounted on a vertical mounting plate 671 that is secured by bolts 672 to the transverse frame member 175. A switch actuator 673 is keyed to a shaft 674 that is rotatably journalled in the mounting plate 671 and in a parallel mounting plate 675 that is also supported from the transverse frame member 175. A lever 676 is also keyed to the shaft 674 and has rollers 677 projecting into the path of upward movement of pallets being raised in the magazine M. The lever 676 is arranged to be actuated by the topmost pallet of the stack being elevated, and by the pallet immediately below the top most pallet.

A normally open switch Sw12 (FIGS. 4 and 7) is positioned near the bottom of the pallet magazine M between the rods 120 against which the stack of pallets is moved by the conveyor chains 100 and 101, which originally carries the new stack of pallets into the magazine. The switch Sw12 has an actuator that is arranged to be actuated by a lever 678 that is contacted by the lowermost pallet of the stack.

A normally closed switch Sw13 (FIGS. 5 and 6) is mounted at the lower end of the pallet magazine M on a bracket 679 secured to the wall panel 83. The actuator of switch Sw13 is arranged to be contacted by a plate 680 (FIG. 5) secured to the side face of each lifter lug 164 and 165 as the lug starts upward along the inside wall of the magazine. A switch Sw14 (FIGS. 31 and 32) is mounted on the frame 610 which carries the vertically movable case spacing mechanism 68. The actuator of the switch Sw14 is arranged to be held open by the bar 640 on the spacing blade 635 when the blade is in its normal, elevated position. When the blade is lowered to intercept a case, the switch is opened.

A switch Sw15 (FIG. 10) is mounted at the rear of the machine on a bracket 681 secured to the inner side of the side wall panel of the machine. The actuator of switch Sw15 is arranged to be contacted by a strap 682 welded to the side angle bar 254 of the stripper plate 56.

A normally open switch Sw16 (FIGS. 5 and 6) is positioned in the rear of the machine behind the panel 83 of the magazine M adjacent the entrance opening 78. A bracket 683 (FIG. 5), on which the switch Sw16 is mounted, is secured to a pair of short frame members 684. The actuator of switch Sw16 is arranged to be contacted by one leg of a bellcrank 686 whose other leg is disposed in the path of downward movement of the lifter lugs 164 and 165. When a lug 164 or 165 contacts bellcrank 686, the bellcrank is rotated in a direction to engage the actuator of the switch Sw16.

A multi-contact switch Sw17 (FIGS. 3 and 17) is disposed above the elevator E on a bracket 700 secured to the lower flange of the frame channel 71. The actuator of switch Sw17 is disposed in alignment with a bar 702 secured to the table T to be actuated thereby as the table is elevated. A normally closed switch Sw18 (FIGS. 5 and 9) is mounted above the rear wall 84 of the pallet magazine M on the mounting plate 675. A switch actuator 704 is arranged to be engaged by a linkage 706 which includes two parallel levers 707 and 708. The lever 707 has one end portion 707b arranged to engage the actuator 704 and each of the levers 707 and 708 has a hub 707a and 708a, respectively, that is pivotally supported between the mounting plates 671 and 675. A pair of bars 712 and 713 are pivotally connected between the ends of the levers 707 and 708. Each bar 712 and 713 has a flange 715 at its upper end to which a contact plate 716 is secured by bolts 717. The contact plate 716 has an upright portion 716a which has a large aperture 716b therein and has a flat, substantially horizontal flange 716c that is in the path of upward movement of the top pallet of the stack of pallets. Accordingly, when the top pallet approaches the top of the magazine, it contacts the flat flange 716c and pivots the linkage 706 to move the end 707b of lever 707 into contact with the actuator 704 of switch Sw18.

A photoelectric unit EEA (FIG. 3) is mounted at the rear of the machine, having a projector EEA1 mounted on one side of the case feed conveyor 52 and a receiver EEA2 mounted on the opposite side of the conveyor. The projected beam is arranged to be broken by a case being moved on the case feed conveyor 52 toward the stripper loading conveyor 57.

A photo-electric unit EEB (FIGS. 3 and 8) has a projector EEB1 mounted on an upper flange 720 of an end frame plate 721. A projector EEB2 is mounted on the channel 576 of the adjustable stop unit 596. The beam is positioned to be broken by an advancing case at the entrance end of the stripper loading conveyor 57.

A photo-electric unit EEC (FIG. 3) is mounted on the top of the machine above the elevator E. A projector EEC1 is mounted on the top flange of one longitudinal frame channel 71 while the receiver EEC2 is mounted on the opposite longitudinal channel member 71. The beam from projector EEC1 is arranged to be broken by the fingers of the stripper plate.

A photo-electric unit EED (FIGS. 3 and 29) is mounted on the top of the machine above the stripper loading conveyor 57. A projector EED1 is mounted on the mounted on the mounting plate 491 above the case feed conveyor 52 while a receiver EED2 is mounted on the frame 504 of the stripper loading conveyor 57. The beam of projector EED1 is inclined downwardly.

A photo-electric unit EEE (FIGS. 4, 5 and 26) has a projector EEE1 (FIGS. 4 and 5) that is mounted on a transverse frame member 74 at the forward end of the machine. The beam from the projector is directed rearwardly along the longitudinal centerline of the machine, through the aperture 716b (FIG. 9) of the switch plate 716, through an aperture 724 (FIG. 26) in the angle bar 514, and onto a receiver EEE2 that is mounted on a short support plate 725 extending between stationary support members 523 and 524. The beam is disposed to be interrupted by a pallet being carried on the under side of the stripper plate.

*Operation*

It will be understood that, with the present machine, a load may consist of several layers of cases and the cases in each layer may be arranged in various patterns through the coordinated use of the turning plate 496 which changes the orientation of the cases, and the case-intercepting blade 635 which varies the spacing of the cases relative to each other in each layer. Assume, for purposes of description, that an interlocked, two-layer load is desired. In FIGURES 33 through 38 the progressive formation of such a load is illustrated. It will be noted that the first layer is formed of three rows A, B and C. Each of the rows A and B has two cases that have the same orientation on the pallet P as they had when they were brought into the machine on the case feed conveyor 52. Also, as shown in FIGURES 33 and 34, the second case of each of the rows has been spaced from the first case by means of the case-intercepting blade 635. Row C consists of three abutting cases that have been turned 90° to their original orientation on the case feed conveyor 52. In the second layer, shown in FIG. 38, the row D has the three turned cases, while each of rows E and F have the two spaced cases. The fact that some of the rows in each layer are turned relative to each other and the fact that the turned cases in the upper row rest on unturned cases in the lower row cause the cases of the entire load to be interlocked in a manner that substantially prevents the separation of any case from the load.

At the beginning of the formation of a two layer interlocked load, the operator sets the selector arm 798 of the layer selector LS in circuit 29 at contact #2, and sets the selector arm 799 of the pattern selector PS in circuit 15 at Y, which corresponds to the above described interlocked pattern. It will be assumed that, at the beginning of the operation, the stripper carriage 56 is in a position forwardly of the pallet magazine M. One set of lifter lugs of the pallet elevator conveyor is on the inner runs of the endless chains near the bottom thereof while the other set of lugs is on the outer runs of the chains near the top, as shown in FIG. 4. The table of the elevator E is in its lower position. The case intercepting blade is in its raised position. The case turning plate is in its lowered position. The various control switches throughout the machine have their contacts in the open or closed position shown in control diagrams FIGS. 39, 40 and 41. Power is supplied to the electrical control members of FIGS. 39, 40 and 41 through trunk lines L1, L2 and L3 which are connected to a source of alternating current by a main disconnect switch Sw20 (FIG. 39). In FIG. 41 a portion of the control circuit is shown that is supplied with direct current through trunk lines L4 and L5 which receive power by means of a step down transformer 801 and a rectifier 802.

To start the operation, the operator closes main switch Sw20 causing L3 and the portion of trunk lines L1, L2 above open contact X2 and X3 to be energized. A timer T is energized through closed contact X1. When the timer T closes contact T2, relay X in circuit 2 is energized through contact T2, causing contacts X2 and X3 in trunk lines L1 and L2, respectively, to be closed. In circuit 3, the motor starting coil SC455 of the case feed in conveyor motor 455 is energized, as also are the motor starting coil SC547 of the stripper loading conveyor motor 547, the starting coil SC428 of the table elevator discharge motor 428, and the starting coil SC117 of the pallet stack feed-in conveyor motor 117. With the starting coils energized, each of the four motors starts to drive its respective conveyor as soon as start switch Sw21 in circuit 1 is closed to energize a relay W that has a contact W1, W2 or W3 in series with the starting coil of each motor.

The counter re-set button on the control panel is pushed to actuate the following contacts: RB–1 in circuit 4 is opened, RB–2 in circuit 29 is opened, RB–3 in circuit 29 is closed, RB–4 in circuit 30 is closed, RB–5 in circuit 29 is opened, RB–6 in circuit 29 is closed, and RB–7 in circuit 31 is momentarily closed. When contact RB–7 is closed, the layer reset coil LRC is energized to withdraw a latch in the layer counter unit and permit a spring in the unit to reset the layer counter to zero. Similarly when contact RB–3 in circuit 29 is closed the several banks of the case counter CCA are reset to zero. The counter A is of the type in which the mechanism takes one step in the reset direction each time the solenoid SOL. A in circuit 29 is energized.

When start switch Sw21 in circuit 1 is momentarily closed, relay W is energized and locked in through contact W4. Contact Sw21–1 in circuit 23 is closed and a contact W5 in circuit 18 is closed. Relay J in circuit 23 is energized, causing contact J4 in circuit 16 to close, energizing relay H which locks in through contact H1. Relay J in circuit 23 is locked in through contacts J5 and H3. Relay E in circuit 6 is energized through contact J6 and locked in through contact E1. Circuit 19 is energized through contacts J3–O3–EEE2 and switch contact Sw5–2, causing the stripper carriage return starter coil SRC of the reversible stripper plate motor 266 to be energized. The stripper carriage 56 is returned to pallet load position above the magazine M, where it contacts and opens switch Sw4 in circuit 20, and contacts switch Sw5 to open contact Sw5–2 in circuit 19 to de-energize stripper return starter coil SRC. The stripper carriage also contacts switch Sw3 to open contact Sw3–2 in circuit 19, and close contact Sw3–1 in circuit 18. Circuit 18 is energized through Sw18 causing pallet raise starter coil PRC of the motor 160 of the lifter conveyor 54 to be energized. When one set of lifter lugs on the conveyor 54 reaches a position just below the surface of the pallet feed conveyor chains 100 and 101, the lugs contact and open switch Sw13 in circuit 18 to de-energize the circuit and the pallet raise starter coil PRC. The lugs are then in a position to lift a stack of pallets off the chains 100 and 101 to raise them toward the stripper carriage.

When relay J was energized, contact J1 in circuit 18 was opened, de-energizing circuit 18 and solenoid No. 1 which controls an air valve connected to case stop plate 465. When solenoid No. 1 is de-energized, the stop plate 465 is raised to case-stopping position. Similarly, when relay E was energized, contact E2 in circuit 21 was closed to energize circuit 21 and the table raise starter coil TRC of elevator motor 380. The table starts moving upward and continues rising until it hits, and opens, switch Sw10 in circuit 21 thereby de-energizing table raise starter coil TRC. The table is stopped a short distance below the top of the elevator shaft, in a position where it will have only a short distance to travel upwardly to unlatch a pallet from the stripper carriage when the carriage is moved forwardly.

At this point in the operation, the pallet feed-in conveyor 99, the case feed conveyor 52, the stripper loading conveyor 57 and the pallet discharge conveyor 60 are all in operation. Relays Z, X, W, J, H and E are energized, solenoid #1 is de-energized, the stripper carriage is disposed above the magazine M, the pallet lifter lugs are in position to lift a stack of pallets from the pallet feed chains, and the case stop plate is in raised position preventing cases from being fed in by the case feed conveyor 52.

A stack of pallets is moved into the magazine M by a fork lift truck and deposited on the moving endless chains 100 and 101 of the pallet feed conveyor 99. The stack is carried across the magazine M and comes to rest against the upright rods 120, with the pallets in contact with, and closing, switch Sw12 in circuit 18 which is energized through Sw12, switch contact Sw3–1, which is held closed by the stripper carriage, contacts H2 and H1, and closed switch Sw18. The pallet raise starter coil PRC in circuit 18 is energized and the stack of pallets is raised. The top pallet momentarily actuates switch Sw11 in circuit 17 which is already de-energized because contact H1 is open. The top pallet continues upwardly and opens switch Sw18 in circuit 16 to de-energize Relay H and open contact H2 in circuit 18 to de-energize pallet raise starter coil PRC. Contact H1 in circuit 17 is closed and then, when the pallet next below the top pallet contacts and closes Sw11 in circuit 17, the pallet lowering starter coil PLC in circuit 17 is energized to start the stack of pallets downward. However, the latch assemblies 300 and 301 on the underside of the stripper carriage latch under the top pallet and hold it suspended from the stripper carriage as the remaining part of the stack is lowered. The stack is lowered until the pallets move out of contact with switch Sw11 causing it to open and de-energize pallet lowering starter coil PLC. The coil PLC has a contact PLC–1 in circuit 20 which closes, when coil PLC is de-energized, and energizes circuit 20 through EEC–1, PLC–1, switch contact Sw17–2, N3, H2 and K1. Circuit 20 energizes the stripper forward starter coil SFC of motor 266 causing the stripper carriage to move forwardly. As the stripper carriage moves forwardly it permits switch Sw4 in circuit 20 to close, and it interrupts the beam of photocell EEC to energize the cell relay and open contact EEC–1 in circuit 20. When the fingers of the stripper are disposed between the rollers of the stripper loading conveyor 57, the stripper carriage contacts and closes switch Sw1 in circuit 24, energizing relay K and opening contact K1 in circuit 20. Circuit 20 and the stripper forward starter coil SFC are de-energized and the stripper carriage comes to rest in the forward position.

When relay H was de-energized, contact H3 in circuit 23 opened, de-energizing relay J. Contact J1 in circuit 18 closes, energizing solenoid No. 1 and causing the control valve to lower the case stop plate on the case feed conveyor 52. Cases are then fed onto the stripper loading conveyor 57. The first case interrupts the beam of photocell EEA to energize the cell relay and close contact EEA–1 in circuit 12. Circuit 12 and relay EEAX is energized and contact EEAX–2 in circuit 29 is opened, de-energizing solenoid A of case counter CCA, allowing a spring in the counter to actuate the counter mechanism to take one step and close contact #1 in case counter A CCA–Bank 1 in circuit 32. A layer counter solenoid SOL. C in circuit 32 is energized causing the contactor arm 805 of layer counter LC in circuit 30 to be swung to the #1 contact point, and causing contact #1 in all banks of the layer counter LC, including contact #1 in layer counter LC–Bank 1 in circuit 4, to be closed.

When relay EEAX was energized, contact EEAX–1 in circuit 18 was closed forming a holding circuit to keep solenoid #1 energized and the case stop plate in depressed position. The first case then interrupts beam of cell EEB to energize the cell relay and close contact EEB–1 in circuit 13. Circuit 13 and relay EEBX are energized to open contact EEBX–2 in circuit 29 and de-energize a solenoid SOL. B of counter B, permitting counter B to take one step to close all #1 contacts in case counter CCB–Bank 3 in circuit 29.

The first case moves over the stripper loading conveyor 57 to a position against the plate 555 and interrupting the beam of photocell unit EED to energize the relay of the unit and close contact EED–1 in circuit 4 and contact EED–2 in circuit 15.

The second case moves over the depressed case stop plate and past photocell unit EEA, to interrupt the beam and energize the relay of the unit causing contact EEA–1 in circuit 12 to close and energize relay EEAX. Contact EEAX–2 in circuit 29 is opened, de-energizing solenoid A of case counter A and allowing a spring in the counter to actuate the mechanism to take one step and close contact 2 in CCA–Bank 6 in circuit 4. Contact EEAX–3 in circuit 4 is closed energizing relay B through contact P2, contact #2 of CCA–Bank 6, and contact #1 of LC–Bank 1. Relay B locks in through B1 and N1. Contact B2 in circuit 18 is opened, de-energizing solenoid #1, permitting case stop plate to rise in front of the following cases on the case feed conveyor.

The second case moves past photocell unit EEB to interrupt the beam and energize the relay of the unit. Contact EEB–1 in circuit 13 is closed, energizing relay EEBX and opening contact EEBX–2 in circuit 29. Solenoid B is de-energized, permitting counter CCB to take one step and close contact #2 in CCB–Bank 6 in circuit 15. Circuit 15 is energized through contacts N4, EED–2, pattern selector contact Y, contact 2 of CCB–Bank 6 and contact P4. Relay S is energized and contact S1 in circuit 14 is closed, energizing solenoid #3 which actuates the air valve controlling the case-intercepting blade 635 causing the blade to be lowered into the path of the second case, to stop the case in spaced relation to the first case, as seen in FIG. 1. During its downward movement the blade 635 releases switch Sw14 in circuit 9 permitting the switch to open and de-energize circuit 9 and the relay Z. Contact Z1 in circuit 3 opens to de-energize the stripper loading conveyor motor 547, thus preventing the second case from hitting the blade with an impact which would cause it to bounce away from the blade.

When relay EEBX was energized by the second case, contact EEBX–1 in circuit 4 was closed, energizing relay A through P1, contact #2 of CCB–Band 2 and contact #1 of LC–Bank 1. Relay A is locked in through contacts A1 and EED–1. Also, contact EEBX–3 in circuit 8 was closed so that, when relay S was energized and contact S1 in circuit 14 was closed, circuit 8 was energized, as soon as the contacts of the time delay relay Y were closed. Circuit 11 is energized through contacts A3, Y1, EEBX–1, and K1. Solenoid #2 is energized and actuates a valve that causes the depressible stripper loading conveyor 57 to be lowered whereby to deposit the first and second case on the fingers of the stripper plate. In its lowered position, the depressible conveyor closes switch Sw6 in circuit 26, energizing relay N. Contact N4 in circuit 15 opens, de-energizing relay S and causing contact S1 in circuit 14 to open, de-energizing solenoid #3. Solenoid #3 actuates the control valve, causing the interceptor blade to be raised, switch Sw14 in circuit 9 to be closed, energizing relay Z and closing contact Z1 in circuit 3. The motor of the live rolls of the depressible conveyor is energized again.

The energization of relay N causes contact N1 in circuit 19 to close, energizing circuit 19 through contacts A2, N1, C1 and switch contact Sw5–2. The stripper return starter coil SRC in circuit 19 is energized causing the stripper carriage to move rearwardly carrying the two cases. As the stripper carriage moves rearwardly, it opens switch Sw1 in circuit 24, de-energizing relay K. As the plate continues rearwardly, it contacts switch Sw2, closing contact Sw2–1 in circuit 18 and energizing solenoid #1 which permits the air valve to pull the case stop plate down and allow case #3 to be moved toward the depressible stripper loading conveyor 57.

When the stripper carriage moves rearwardly a predetermined distance, the cases pass out of the path of the beam of photocell unit EED. When the beam is once more established, the relay in the unit is de-energized and contact EED–1 in circuit 3 is opened, de-energizing relay A. Contact A2 in circuit 19 opens, de-energizing the stripper return starter coil SRC and stopping the rearward movement of the carriage. It will be noted that, when the rearward movement of the carriage is stopped, the cases on the carriage are disposed rearwardly of the plate 505 on the rear edge of the depressible stripper loading conveyor. Contact A3 in circuit 11 is opened, de-energizing solenoid #2 and causing the depressed stripper loading conveyor to be raised.

When the stripper loading conveyor is raised, it opens switch Sw6 in circuit 26, de-energizing relay N. Contact N3 in circuit 20 closes, energizing the stripper forward starter coil SFC. As the stripper mover forward, cases #1 and #2 contact the stripper plate 505, causing the cases to be displaced rearwardly relative to the stripper fingers which move to their forward position between the rollers of the stripper loading conveyor.

When the stripper reaches its forward position, it closes switch Sw1, in circuit 24, and energizes relay K. Contact K1 in circuit 20 opens to de-energize the stripper forward starter coil SFC.

Therefore, at the end of the formation of row 1 of layer 1, the stripper plate is in its forward position, the case stop plate is down, the interceptor blade is up, the turn plate is down, the case counter CCA has recorded two cases, and the layer counter LC has recorded one layer.

Cases #3 and #4 enter the machine and are arranged in spaced relation in row B in the same manner as cases #1 and #2 were arranged to form row A. The formation of the row B ends with the stripper in the forward position and case #5 being advanced on the case feed conveyor 52.

Case #5 actuates counters CCA and CCB as explained above. When case #5 closes contact #5 of CCA–Bank 4 in circuit 7, relay G is energized. Contact G1 in circuit 10 is closed, energizing solenoid #4 to raise the turning plate 496 in front of case #5, causing case #5 to be turned approximately 90°. Similarly, as cases #6 and #7 are moved into the machine, the turning plate turns them and causes them to be aligned with case #5 to form row C. It is to be noted that the case intercepting blade is not lowered during the formation of row C since only the #2 and #4 contacts of case counter CCB–Bank 6 in circuit 15 are in series with the #1 contact of layer counter LC–Bank 2. Accordingly, relay S, which controls the blade, is energized during the formation of the first layer only after cases #2 and #4 are recorded on case counter B.

Case #7 passes photocell units EEA and EEB to close contact #7 on case counter CCB–Bank 2 in circuit 4, energizing circuit 4 through contacts EEBX–1, P1, contact #7 of case counter CCB–Bank 2, and contact #1 of layer counter LC–Bank 1. Relay A is energized, closing contact A5 in circuit 29 and energizing circuit 29 through interrupter contact A6, contact #7 of case counter CCA–Bank 2 and R2. When circuit 29 is energized, solenoid SOL. A is energized. As previously mentioned, the case counter is of the type wherein, when the solenoid is energized, the mechanism takes one step in the reset direction. As the step is taken, the interrupter contact A6 is first opened and then closed, causing the solenoid to be de-energized and then re-energized. This automatic resetting operation is continued until case counter CCA is reset to zero. Similarly, case counter B is reset to zero by solenoid SOL. B in circuit 29 which is energized through interrupter contact B6, contact 7 of case counter CCB–Bank 3, R2 and A5.

When contact 7 in case counter CCB–Bank 4 is closed in circuit 4, relay C is energized. Contact C1 in circuit 4 is closed in parallel with contact EED–1 so that when the rearward movement of the third row of cases opens contact EED–1, relay A will remain energized and contact A2 in circuit 19 will remain closed to keep the stripper plate moving rearwardly.

Contact C4 in circuit 21 is closed, energizing circuit 21 through contacts C4, K2, E2, and switch contact Sw9–2. The table raise starter coil TRC is energized and the table is elevated until it contacts switch Sw17 and opens contact Sw17–1 in circuit 6, de-energizing relay E. Contact E2 in circuit 21 opens, de-energizing the table raising starter coil TRC and stopping the upward movement of the table. The switch Sw17 is so located that the upward movement of the table is stopped just after the table has contacted the pallet which is supported on the latch assemblies of the stripper carriage in its forward position. The table lifts the pallet upwardly away from the prongs on the latch assembly, permitting the springs 320 to swing the latch arms outwardly, as shown in FIG. 15. The pallet is then resting entirely on the elevator table T and closing switch Sw7 in circuit 27. Circuit 27 is energized, causing relay O to be energized and contact O1 in circuit 19 to be closed. The stripper carriage return starter coil SRC in circuit 19 is energized through Sw3–2, contacts A2, N1, M1, O1, F1, and Sw5–2. The stripper carriage moves all the way to the rear of the machine above the magazine M. During the rearward movement of the stripper carriage, the entire layer of cases was stripped off the carriage by the transverse stripper plate 58. The layer of cases interrupts the beam of photocell unit EEC, energizing the relay and closes contact EEC–2 in circuit 22 and opening EEC–1 in circuit 20. At the rear of the machine, the stripper carriage contacts switch Sw5, opening contact Sw5–1 in circuit 4 and Sw5–2 in circuit 19, de-energizing relay C and the stripper return starter coil SRC. Contact C4 in circuit 18 is closed.

At the rear of the machine, the stripper also contacts switch Sw3, closing contact Sw3–3 in circuit 22 to energize the table lowering coil TLC through contacts Sw3–3, EEC–2, and switch Sw8. When the table is lowered a predetermined distance, the cases clear the beam of photocell unit EEC, allowing the relay of the unit to be de-energized and opening contact EEC–2 in circuit 22 and closing contact EEC–1 in circuit 20. When contact EEC–2 in circuit 22 is opened, the table lowering starter coil TLC is de-energized and the descent of the table is stopped so that the layer of cases on the table is in position to receive the second layer after it has been formed and stripped from the carriage 56.

When contact EEC–1 in circuit 20 closes, the stripper carriage forward starter coil SFC is energized through contacts PLC–1, Sw17–2, N3, H2, and K1, causing the stripper carriage to be moved to its forward position.

When relay C was de-energized, contact C1 in circuit 4 was opened, de-energizing relay A. Contact A6 in circuit 4 opens, de-energizing relay B since contact N1 is also open. Contact B2 in circuit 18 closes, energizing circuit 18 through C4, B2, W5, and J1 to energize solenoid SOL. #1, causing the case stop plate 465 to be lowered, permitting cases to enter the machine to start the formation of the second layer. Contact A3 in circuit 11 opens, de-energizing solenoid SOL. #2 to cause the stripper loading conveyor to be raised. Switch Sw6 in circuit 26 is opened by the stripper loading conveyor as it is raised, opening circuit 26 and de-energizing relay N.

*Formation of second layer.*—The first case of the second layer passes photocell unit EEA causing case counter CCA to step to "one." Circuit 32 is energized through contact #1 of CCA-Bank 1, energizing solenoid SOL. C which is effective, when energized, to step the layer counter. Contact #2 in the layer counter LC-Bank 2 in circuit 7 is closed, energizing circuit 7 and relay G through contact #1 of CCA-Bank 3. Contact G1 in circuit 10 closes, energizing solenoid SOL. #4 which, when energized, raises the case turning plate 496 in front of the first case. The first case is turned and passes photocell unit EEB to step counter CCB to "one." The second case passes unit EEB to step counter CCA to "two." Case #2 is then turned 90° and passes unit EEB to register "two" on case counter CCB. Case #3 is moved into the machine, is turned 90°, and in a similar manner, actuates case counters CCA and CCB to "three." While these three cases are being moved onto the stripper loading conveyor, the stripper carriage, as previously mentioned, moves forward so that the fingers of the carriage are disposed between the rollers of the conveyor.

When contact #3 of case counter CCB-Bank 1 in circuit 4 is closed, circuit 4 is energized, causing relay A to be energized. Contact A3 in circuit 11 is closed, energizing circuit 11 and solenoid SOL. #2 through A3, Y1, EEBX–1 and K1. When solenoid SOL. #2 is energized, the stripper loading conveyor is depressed to deposit row D of the second layer on the fingers of the stripper carriage. The stripper loading conveyor closes switch Sw6 in circuit 26, energizing relay N. Contact N1 in 19 closes, energizing the stripper return coil SRC through Sw3–2, A2, N1, C1 and Sw5–2. The carriage starts rearward with row D. The carriage closes switch Sw2–1 in circuit 18, energizing solenoid SOL. #1 which causes case stop plate 465 to be lowered. Case #4 of the second layer enters the machine. When the case counter CCA is moved to the "fourth" position, circuit 7 is opened and relay G is de-energized since contact #4 is not used in either Bank 3 or 4 of case counter CCA. Accordingly, contact G1 in circuit 10 is opened, de-energizing solenoid SOL. #4 and causing the case turning plate 496 to be lowered. As the carriage moves rearwardly, the row D clears the beam of unit EED, de-energizing the relay of the unit and opening contact EED–1 in circuit 4 to de-energize relay A. Contact A3 in circuit 11 is opened, de-energizing solenoid SOL. #2 and causing the stripper loading conveyor to be raised. As the conveyor is raised, switch Sw6 in circuit 26 is opened, de-energizing relay N. Contact N3 in circuit 20 is closed, energizing the stripper forward starter coil SFC.

Case #5 is spaced from case #4 in row E and case #7 is spaced from case #6 in row F by means of the case spacing blade 635 which is actuated by solenoid SOL. #3 in circuit 14 when relay S in circuit 15 is energized. It will be noted that, during the formation of the second layer, relay S is energized and the blade is lowered only after contacts #5 and #7 of case counter CCB-Bank 7 are closed, since only these two contacts are in the circuit that contains the #2 contact of layer counter LC-Bank 2.

When all three rows of the second layer have been formed, the stripper carriage is moved rearwardly and contacts switch Sw3, closing contact Sw3–3 in circuit 22 and causing the starter coil TLC to lower the table. The table continues down until switch Sw8 in circuit 22 is opened, de-energizing the down coil and stopping the downward movement of the table after the loaded pallet is deposited on the continuously moving discharge conveyor 60. As the pallet is discharged from the machine, it contacts switch Sw9 and opens contact Sw9–2 in circuit 21 to keep the table raising coil TRC de-energized until the pallet clears the elevator. Contact Sw9–1 in circuit 6 closes, energizing relay E, and closing contact E2 in circuit 21. When the pallet is clear of the table, contact Sw9–2 closes, energizing circuit 21 and causing the table raising starter coil TRC to raise the table until it opens switch Sw10 in circuit 21, thereby de-energizing coil TRC.

When the contact arm 805 of the layer counter LC in circuit 30 was moved to the #2 position, circuit 30 was energized through contact 7 of CCB-Bank 5 and contacts R2 and A5. Relay F was energized, closing contact F1 in circuit 5 to energize relay D. Contact D2 in circuit 18 was closed. Then when stripper carriage, in its rearward movement, closes switch Sw15 in ciruit 18, relay H in circuit 16 is energized, contact H2 in circuit 18 is closed, and the pallet raise coil PRC is energized through switch contact Sw3–1 that was also closed by the rearward movement of the stripper carriage. The starter coil PRC causes the stack of pallets to be raised to latch the topmost pallet to the latches on the under surface of the carriage. Also, when relay F in circuit 30 was energized, the layer reset solenoid LRC in circuit 31 was energized through contact F3 to reset the layer counter. The case counters CCA and CCB are reset as previously explained.

Thus, at the end of the formation of the load, the stripper carriage is in its rearmost position with a pallet latched thereon, and the table T is in an intermediate elevated position ready to be raised to unlatch the pallet when a new layer has been formed on the carriage.

If an operation of loading cases of one size on a pallet is followed by an operation wherein larger cases are loaded on the same size pallet, the case spacing blade 635 must be adjusted in the direction of movement of the cases on the stripper loading conveyor 52. This is so because, for a pallet of a given size, the longer the cases, the shorter the spacing must be between the cases in a line. Adjustment of the position of the case intercepting blade 635 is carried out automatically by a control circuit arrangement illustrated in FIGURES 42 and 43. In this circuit, electrical energy is obtained from trunk lines L1 and L2 which are continuations of lines L1 and L2 of FIGURE 41. The cam 648, which is carried by the inner movable frame 610 (FIG. 31) of the case spacing mechanism, is indicated diagrammatically in FIG. 43 as a block and the switch actuator arms of the switches Sw23, Sw24, and Sw25 are indicated as circles 900, 901 and 902. The pattern selector PS in circuit 7 (FIGS. 39 and 40) is arranged to accommodate several sizes of cases, each case having a different length. Assume that a pallet has been loaded with cases X, and an operation is to be started wherein cases Y are to be loaded. The operator swings the selector arm 799 of the selector PS to move wiper arm 904 of pole #2 to contact Y. Then, when lines L1 and L2 are energized, relay NN will be energized, closing contact NN1 in circuit 39. The forward starter coil 625 FC of motor 625 is energized and the power screws 618 (FIG. 32) are turned to move the inner frame 610 in a forward direction, carrying the cam 648 from switch Sw23, over the actuator 901 of switch Sw24 and into contact with the actuator 902 of switch Sw25. When the contact Sw25–1 of switch Sw25 is opened in circuit 39, the coil 625 FC will be de-energized and the frame 610 will stop. In this stopped position, the blade 635 is disposed in the correct position to properly space "Y" type cases. It will be evident that with this arrangement, the position of the blade 635 can be automatically adjusted by actuating the selector arm 799, and the mechanism can be quickly and easily adjusted for other size cases merely by varying the positions of the adjustably mounted switches.

The position of the case stop plate 555 may also be adjusted automatically by means of the control arrangement of FIGS. 42 and 44. Assume that the case stop plate 555 is to be adjusted for "Y" type cases. The operator sets the selector arm 799 of PS pole 1 at the Y contact to move the wiper arm 910 of PS pole #4 (FIG. 42) to contact Y. Then, when lines L1 and L2 are energized, relay AA is energized, an dcontact AA1 in circuit 49 is closed. The reverse starter coil 584RC of motor 584 is energized and the stop plate 555 is moved in a reverse direction, or from switch Sw35 toward switch Sw36 as seen in FIG. 30. As the plate moves in the reverse direction, the cam 600 releases the actuator of switch Sw35 and contacts the actuator of switch Sw36 to open the contact Sw36–1 of said switch in circuit 49. When contact Sw36–1 in circuit 49 is opened, the reverse starter coil 584RC is deenergized, and the case stop plate 555 is stopped in the position adapted to use with "Y" cases.

The position of the stripper plate 58 may also be automatically adjusted by means of the control circuit shown in FIGURES 42 and 45. It will be understood that the cam 920 (FIG. 45) is mounted on the movable stripper plate 58 while the four switches Sw30, Sw29, Sw27 and Sw26 are adjustably mounted in fixed position on the stationary transverse channel 576 (FIG. 3). Assume that "Y" type cases are to be loaded on a particular pallet. The operator sets the selector arm 799 of PS pole #1 to the Y contact to move the wiper arm 921 of PS pole #3 (FIG. 42) to the Y contact. Then, when lines L1 and L2 are energized, relay JJ will be energized and contact JJ1 in circuit 55 will be closed. Circuit 55 will be energized through closed switch Sw29. The forward starter coil 596FC of motor 596 will be energized and the stripper plate will be moved in a forward direction toward switch Sw27. When switch Sw27 is opened, coil 596FC will be de-energized and the stripper plate will stop in a position particularly adapted to handle "Y" cases.

In FIGURES 46 and 47 a second embodiment of the pallet loading machine of the present invention is diagrammatically illustrated. This embodiment is particularly adapted for handling relatively light-weight, disposable pallets such as fibre, paper or heavy cardboard pallets. A stripper carriage 930 is mounted for reciprocation in the machine and carries a plurality of suction cups 931 on its lower surface. A pallet elevating conveyor 932 raises the disposable pallets PP to a position wherein the topmost pallet is near the lower end of the suction cups. Then, when the cups are connected to a source of air at a negative pressure, the topmost pallet will be drawn upwardly into contact with the cups and held in this position as the stripper carriage reciprocates back and forth at the forward end of the machine during the formation of a layer of cases on the carriage as explained previously. After the layer of cases has been formed, the disposable pallet is dropped onto the table 933 by releasing the suction pressure in the cups. When the stripper carriage moves further rearwardly, the layer of cases will be stripped off the carriage and deposited on the disposable pallet by a stripper plate 934.

It will be noted in FIG. 47 that the table 933, that is mounted on the elevator 935, is in the form of a live roll conveyor that is driven by a motor 936 supported from the table. With this arrangement the loaded pallet can be discharged directly from the table and will be completely supported as it moves onto an intermediate conveyor 937 and a take-away conveyor 938.

The pallet elevating conveyor 932 comprises two endless chains 939 and two chains 940 that carry flights 941 adapted to support a rigid plate 942 on which the stack of pallets rests. The conveyor chains 939 and 940 are driven by a reversible motor (not shown) so that, when the last pallet of the stack has been picked off the rigid plate 942 by the suction cups, the direction of movement of the chains 939 and 940 may be reversed to the lower the plate 942 to a position to receive a new stack of pallets.

A case feed-in conveyor 943 delivers cases to the machine, while a case turning plate 944, an adjustable case-intercepting blade 945, an adjustable case stop plate 946 and the adjustable stripper plate 934 are arranged to position and orient the cases during the formation of each layer. All of these members may be identical in construction and operation to the corresponding members of the machine of FIG. 1.

In FIGURES 48 and 49 a third embodiment of the case handling machine of the present invention is illustrated. This machine is particularly adapted for operations wherein the layers are handled without using pallets. A stripper carriage 960 is mounted for reciprocating movement along the top of the machine to form a layer of cases on its upper surface. When the layer has been formed, the carriage moves to the rear of the machine causing the layer of cases to be stripped off the carriage by a stripper plate 962 and deposited on a table 964 of an elevator 965. The table 964 is in the form of a live roll conveyor whose rollers are driven by a motor 967 supported from the table. The operation of the case feed-in conveyor 970, the case turning plate 971, the adjustable case-interceptor blade 972, the adjustable case stop plate 973, and the adjustable stripper plate 962 will be evident.

With this arrangement, the live roll table 964 will be adapted to discharge the entire load onto an intermediate conveyor 975 and a take-away conveyor 976.

The use of a case interceptor blade 972 to form an interlocked load of cases is of particular importance when no pallet is used since the increased stability of an interlocked load makes the handling of cases without pallets practicable.

Certain changes in the control circuit of the machine of FIG. 1 must be made to accommodate it to the embodiments of FIGURES 46 through 49. However, such changes may be readily made when the basic control diagram of FIGURES 39, 40, 41 and 42 are thoroughly understood.

It will be understood that the machine of the present invention is capable of handling any articles having the general configuration of cases, boxes or the like. Accordingly, in the claims, the term "cases" will be used to generically indicate all such articles. Also it is evident that while a load has been described wherein the side surfaces of the superposed cases form a substantially flat wall, it is evident that loads may be formed wherein the edge of one layer overhangs the edge of the layer below.

From the foregoing description, it will be recognized that the present invention provides a machine particularly adapted to automatically form cases into uniform, stable layers. In the embodiments of the machine that form layers of cases on pallets, the novel mechanism for handling the pallets makes it possible to form successive loads with a minimum of lost time between the loads. The coordinated use of the adjustable case turning plate and the adjustable case spacing blade provides means for arranging a variety of different layer patterns in a load of superposed layers to form an exceptionally stable, interlocked load.

Having thus described our invention, what we claim as new and desire to protect by Letters Patent is:

1. A case handling machine comprising a support, a stripper member mounted on said support for movement in a vertical plane between a raised position and a lowered position, a carriage disposed on said support and having a case-receiving portion and a case-accumulating portion, means mounting said carriage for reciprocating movement relative to said support and above said stripper member when said stripper member is in lowered position to move the case-receiving portion of said carriage between a first position on one side of the vertical plane of said stripper member and a second position on the opposite side of said vertical plane, means for positioning a row of cases on said case-receiving portion at said first position, and means for reciprocating said carriage to move said case-receiving portion from said first position to said second position and returning it to said first position, said stripper member being arranged to be positioned in the path of movement of the row of cases as said case-receiving portion is returned to said first position to move the row of cases from said case-receiving portion of said carriage to said case-accumulating portion.

2. A case handling machine comprising a conveyor arranged to advance cases along a predetermined path and having a plurality of spaced rollers, a carriage mounted for movement relative to said conveyor and having a plurality of tines at a forward end portion and a flat support surface rearwardly of said tines, means mounting said conveyor for downward movement from a raised position with the top surfaces of the rollers above the top surfaces of the tines to a lowered position wherein the top surfaces of the rollers are below the top surfaces of the tines, means mounting said carriage for reciprocating movement from a first position with the tines between said rollers to a second position rearwardly of said first position, a stripper member carried by said roller conveyor at the same height as said rollers, means for forming a row of cases on said roller conveyor when said conveyor is in the raised position, means for moving said roller conveyor to the lowered position to deposit the row of cases on said tines, means for moving said carriage from said first position to said second position to carry the row of cases rearwardly of said stripper member and then returning said carriage to said first position, and means for raising said roller carriage prior to the return of said carriage to said first position whereby the line of cases on the tines contacts said stripper member and is displaced rearwardly from said tines during the return movement.

3. A method of forming a layer of cases comprising the steps of positioning a row of cases on a support surface at a first station, moving said support surface rearwardly away from said first station to a second station, disposing an abutment member between said first and second stations, moving said support surface forwardly to said first station causing the row of cases to contact said abutment member and be displaced rearwardly on said support surface, positioning a second row of cases on said support surface at said first station, removing said abutment member from between said stations, moving said support surface rearwardly to said second station, disposing said abutment member between said first and second stations, and moving said support surface forwardly to said first position causing the second row of cases to contact said abutment member and be displaced rearwardly on said support surface to a position adjacent the first row to form a layer.

4. In a case handling machine, a carriage mounted in an elevated position, two pair of latch members pivotally mounted on opposite sides of the under surface of said carriage for movement between inner and outer pivoted positions, means on said latch members arranged to grip a pallet and hold it suspended between said latch members when said members are in the inner pivoted position, spring means connected between said latch members and said carriage and arranged to bias said latch members away from said inward position toward said outer position, and an elevator mounted below said carriage and having a support member movable upwardly to a position substantially at the level of said latch members and into contact with a pallet suspended from said latch members and lift it upwardly away from said gripping means to permit said spring means to pivot said latch members outwardly out of the path of downward movement of the pallet on said elevator support member.

5. In a case handling machine, a support, a carriage mounted for movement along said support from a pallet-receiving station to a pallet-discharge station, a plurality of oppositely disposed arms pivotally mounted on the under surface of said carriage, a latch member pivotally mounted on each arm, a prong on each latch member, a spring connected between each pivotal arm and the associated latch member for urging said latch member to a position with the prong projecting upwardly, the prongs of all said latch members cooperating to provide a support surface, cam means operatively connected between said support and said arms for urging said arms to an inwardly pivoted substantially vertical position at said pallet-receiving station, and means for biasing said pivotal arms outwardly in opposition to the urging of said cam means.

6. In a case handling machine, a support, a carriage mounted for movement along said support, two lines of arms mounted in opposed relation on the under surface of said carriage, each line being arranged for pivotal movement toward and away from the other line, resilient means normally urging said arms to their outer pivoted positions, cam means carried by said support and arranged to engage said arms for holding said arms in an inwardly pivoted position against the urging of said resilient means, a latch member pivotally mounted on each arm, means defining a support surface on each latch member, cooperating abutment surfaces on each arm and the associated latch member defining a position wherein the support surface of the latch member faces upwardly, spring means connected between each arm and the associated latch member and arranged to pivot the latch member in a direction to bring the abutment surfaces into engagement, means for moving a pallet upwardly between said lines of arms and into engagement with the latch members thereon to pivot said latch members in one rotary direction against the bias of said spring means and permit the pallet to move to a position above the latch members, said spring means being effective to pivot said latch members in the opposite rotary direction and move said abutment surfaces into engagement after the pallet reaches said elevated position and position the support surfaces of said latches under the pallet, means for lowering the pallet onto said support surfaces, and means for moving said carriage along said support to carry said arms out of contact with said cam means whereby to permit said resilient means to swing said arms and said latch member to their outer position when the pallet is subsequently lifted from said latches.

7. In a case handling machine, an elongated support structure, a pallet elevator disposed at a rear portion of said structure, a roller conveyor mounted at a forward portion of said structure, a table elevator disposed in said structure in alingnment with and between said pallet elevator and said conveyor, a carriage mounted for reciprocating movement longitudinally in said structure, said carriage having a plurality of fingers at its forward end and a support surface rearwardly of said fingers, latching means on the under surface of said carriage, means for actuating said pallet elevator when said carriage is in a rearward position above said pallet elevator to raise a stack of pallets thereon and move the uppermost pallet into engagement with said latching means to be gripped thereby, power means for moving said carriage forwardly to a position with said fingers disposed between the rollers of said roller conveyor and the pallet suspended above said table elevator, means including said power means for forming a plurality of lines of cases on said roller conveyor and transferring the lines to the fingers of said carriage and then to the flat support surface of said carriage to form a layer of cases, means on said table elevator for removing the suspended pallet from said latching means upon a predetermined upward movement of said table elevator, and a stationary stripper member disposed above said carriage substantially in alignment with the rearward edge of the table elevator and arranged to strip the layer of cases from said carriage and deposit it on the pallet on said table elevator when said carriage is moved to a position entirely rearwardly of said stripper member.

8. In a case handling machine, a support, a carriage disposed on said support and having a plurality of tines adjacent one end and a flat support surface adjacent said tines, a roller conveyor on said support and having rollers disposed between the tines of said carriage, a live roll conveyor in said support below said carriage, means for forming a row of cases on said roller conveyor, means for transferring said row from said roller conveyor to said tines, means for reciprocating said carriage to move said tines from a forward position between said rollers to a rearward position above said live roll conveyor and back to said first position each time a row of cases is transferred to said tines, a stripper member movable into the path of the row of cases on said tines each time said tines are returned to said forward position to displace the row of cases on said tines rearwardly from said tines to said flat surface, a stationary stripper plate disposed above said carriage rearwardly of said live roll conveyor, said reciprocating means being arranged to move said carriage to a position entirely rearwardly of said stationary stripper when a predetermined number of rows of cases are transferred to said flat surface to cause the cases to be stripped from said carriage and deposited on said live roll conveyor.

9. In a case handling machine, a carriage mounted in an elevated position for reciprocating movement between a forward and a rearward position, a pallet elevating conveyor disposed below said carriage when said carriage is in the rearward position, electric power means arranged upon being energized to actuate said elevating conveyor in a direction to raise a pallet into contact with said carriage, means on the underside of said carriage for gripping the pallet as it contacts said carriage, a control circuit arranged to energize said power means upon being activated, means for forming a layer of cases on said carriage at said forward position and including a case feed conveyor, and a case counter and a layer counter connected in said control circuit and arranged to be actuated by cases being advanced on said feed conveyor, said control circuit being arranged to be activated upon the recording in said counters of a predetermined number of cases and layers of cases whereby a pallet is raised into contact with the gripping means on said carriage each time a predetermined number of layers of cases have been positioned on said carriage.

10. In a case handling machine, a support, a carriage mounted for reciprocation in said support, gripping means carried on the under surface of said carriage, an elevating conveyor mounted below said carriage and adapted to support a stack of superposed pallets, a reversible motor opertaively connected to said elevator, a first circuit associated with said motor and arranged upon being energized to operate said motor in a direction to raise said conveyor to move the uppermost pallet of a stack to an elevated position in contact with said gripping means, a switch in said first circuit arranged to be actuated by a pallet in said elevated position to de-energize said first circuit, and a second control circuit associated with said motor and arranged upon being energized to operate said motor in a direction to lower said conveyor, and a second switch in said second circuit arranged to be actuated by a pallet below said uppermost pallet to energize said second circuit.

11. A case handling machine comprising a support, a carriage disposed on said support and having a case-receiving portion and a case-accumulating portion, means mounting said carriage for reciprocating movement relative to said support to move the case-receiving portion of said carriage between a forward position and a rearward position, means for forming a row of cases on said case-receiving portion at said forward position, means for reciprocating said carriage to move said case-receiving portion from said forward position to said rearward position and returning it to said forward position, a stripper member disposed above a portion of said carriage between said case-receiving portion and said case-accumulating portion when said carriage is in said forward position, said stripper member being arranged to be positioned in the path of movement of the row of cases as said case-receiving portion is returned to said forward position whereby to move the row of cases from said case-receiving portion of said carriage to said case-accumulating portion, and an abutment member disposed above the path of movement of said carriage rearwardly of said case-accumulating portion, said abutment member being mounted in fixed position and spaced above the carriage by a distance less than the height of cases being handled, said reciprocating means being arranged to move said carriage to a position wherein both said case-receiving and said case-accumulating portions of said carriage are rearwardly of said abutment member whereby rows of cases on said carriage are stripped therefrom.

12. In a case handling machine, an elongate support structure, a pallet elevator in said support structure, a table elevator in said structure disposed forwardly of said elevator, a carriage mounted for movement at an upper portion of said structure from a position above said pallet elevator to a position above said table elevator, a plurality of latch-support hangers pivotally mounted on said carriage, a latch lever pivotally mounted on each hanger, first spring means connected between each lever and the associated hanger and urging said lever to a position projecting inwardly toward the longitudinal center of said structure, cam means on said structure associated with said hangers and arranged to urge said hangers inwardly of said structure to a position wherein said latch levers in their inwardly projecting position are in the path of upward movement of a pallet being elevated by said pallet elevator, second spring means connected between said hangers and said carriage and resisting movement of said hangers to said inward position, said levers being arranged to swing outwardly on said hangers against the resistance of said first spring means when contacted by the upwardly moving pallet, said first spring means being effective to swing said latch levers to said inwardly projecting position under the elevated pallet to prevent lowering of said pallet, means for raising said pallet elevator to move a pallet past said latch levers to a position above said levers, means for lowering said pallet elevator to deposit the pallet on said latch levers, means for moving said carriage forward to a position wherein said latching levers are disposed above said table elevator, said cam having camming surfaces receding from said hangers during forward movement of said carriage, the weight of the pallet on said latch levers being effective to hold said levers in said inwardly projecting position against the action of said second spring means during forward movement of said carriage and after disengagement of said cam from said hangers, means for raising said table elevator to a position wherein a portion of said table is disposed substantially at the level of said latch levers and in engagement with the pallet resting on said levers, continued upward movement of said table elevator being effective to lift the pallet from said levers, whereby said second spring means swings said hangers outwardly to withdraw said latch levers from the path of downward movement of the pallet when said table elevator is lowered.

References Cited in the file of this patent
UNITED STATES PATENTS

| | | |
|---|---|---|
| 1,330,639 | Leumann | Feb. 10, 1920 |
| 1,399,528 | Sommers | Dec. 6, 1921 |
| 1,517,707 | Castleman | Dec. 2, 1924 |
| 1,522,967 | Meyer et al. | Jan. 13, 1925 |
| 1,563,792 | Rickard | Dec. 1, 1925 |
| 1,564,536 | Davis | Dec. 8, 1925 |
| 1,705,570 | Horstkotte | Mar. 19, 1929 |
| 1,737,762 | Howe | Dec. 3, 1929 |
| 1,846,390 | Groth | Feb. 23, 1932 |
| 1,907,850 | Stevenson | May 9, 1933 |
| 1,980,850 | Clark | Nov. 13, 1934 |
| 2,130,323 | Lueckel | Sept. 13, 1938 |
| 2,323,174 | Wikle | June 29, 1943 |
| 2,335,078 | Osborn | Nov. 23, 1943 |
| 2,403,942 | Mathers | July 16, 1946 |
| 2,438,236 | Strom | Mar. 23, 1948 |
| 2,604,971 | Snyder et al. | July 29, 1952 |
| 2,622,721 | Ferguson | Dec. 23, 1952 |
| 2,631,746 | Holstebro et al. | Mar. 17, 1953 |
| 2,647,651 | Vincent | Aug. 4, 1953 |
| 2,659,497 | Verrinder | Nov. 17, 1953 |
| 2,674,896 | Arones | Apr. 13, 1954 |
| 2,699,264 | Bruce et al. | Jan. 11, 1955 |
| 2,701,650 | Stevenson | Feb. 8, 1955 |
| 2,724,482 | De Francisci | Nov. 22, 1955 |
| 2,729,344 | Birchall | Jan. 3, 1956 |
| 2,768,756 | Horman | Oct. 30, 1956 |
| 2,780,340 | Hynson | Feb. 5, 1957 |
| 2,792,950 | Fenton et al. | May 21, 1957 |
| 2,819,805 | Vieth | Jan. 14, 1958 |
| 2,869,739 | Davis | Jan. 20, 1959 |

OTHER REFERENCES

Publication FMC Lock-Load Palletizer Series 406,000. Copyright 1955. Food Machinery and Chemical Corp.